US012632373B2

(12) United States Patent
    Kananda et al.

(10) Patent No.:  US 12,632,373 B2
(45) Date of Patent:       May 19, 2026

(54) SCALABLE MEMORY RESOURCE MANAGEMENT FOR MULTIPLE FORWARDING ENGINE SYSTEMS WITH FUNGIBLE MEMORY SUB-SYSTEMS

(71) Applicant: Juniper Networks, Inc., Sunnyvale, CA (US)

(72) Inventors: Swamy Sadashivaiah Renu Kananda, Tracy, CA (US); Scott Mackie, Santa Cruz, CA (US); Sreenivas Gadela, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 18/882,329

(22) Filed: Sep. 11, 2024

(65) Prior Publication Data

US 2026/0064578 A1      Mar. 5, 2026

Related U.S. Application Data

(60) Provisional application No. 63/688,229, filed on Aug. 28, 2024.

(51) Int. Cl.
    *G06F 12/02*          (2006.01)
(52) U.S. Cl.
    CPC .................................. *G06F 12/023* (2013.01)
(58) Field of Classification Search
    None
    See application file for complete search history.

(56) References Cited

U.S. PATENT DOCUMENTS

| | | | | |
|---|---|---|---|---|
| 7,177,311 B1* | 2/2007 | Hussain | .................. | H04L 49/70 |
| | | | | 370/395.32 |
| 9,021,098 B1* | 4/2015 | Nagle | ..................... | H04L 61/50 |
| | | | | 709/226 |
| 2007/0127382 A1* | 6/2007 | Hussain | .................. | H04L 49/70 |
| | | | | 370/235 |

* cited by examiner

*Primary Examiner* — Baboucarr Faal
(74) *Attorney, Agent, or Firm* — Pokotylo Patent Services

(57) ABSTRACT

A memory controller and method for controlling the allocation of blocks of a fungible memory for each of a plurality of packet forwarding engines (PFEs) to ingress instructions and/or egress instructions.

9 Claims, 27 Drawing Sheets

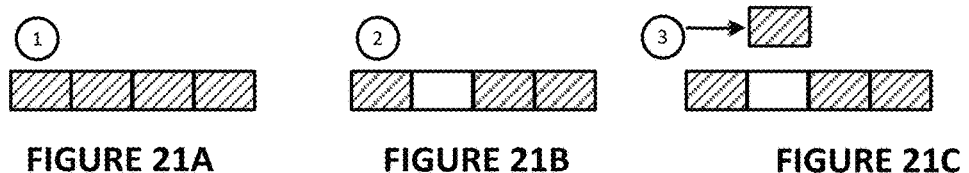
FIGURE 21A          FIGURE 21B          FIGURE 21C
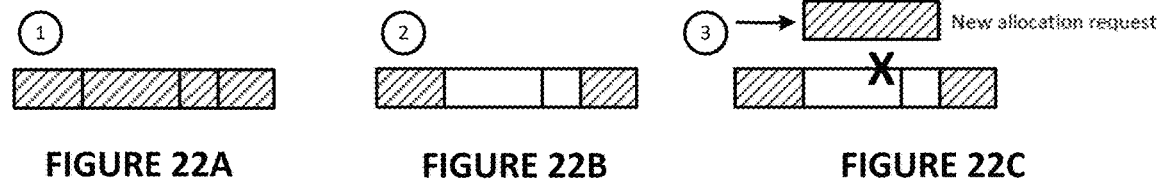
FIGURE 22A          FIGURE 22B          FIGURE 22C
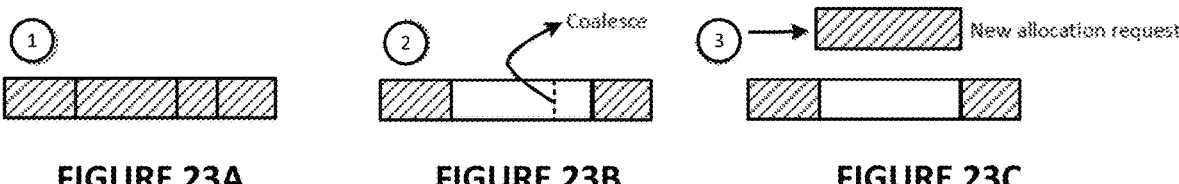
FIGURE 23A          FIGURE 23B          FIGURE 23C

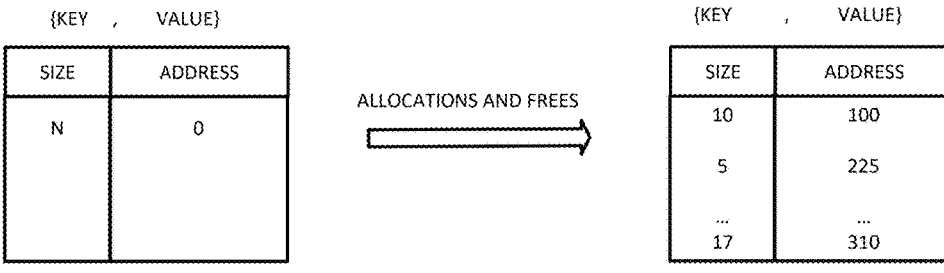
FIGURE 24A                    FIGURE 24B
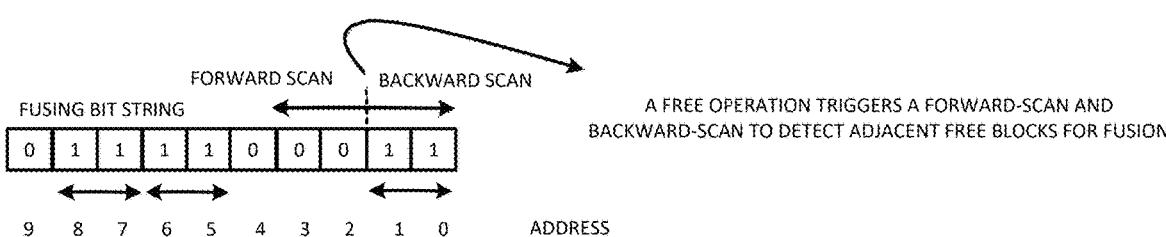
FIGURE 25
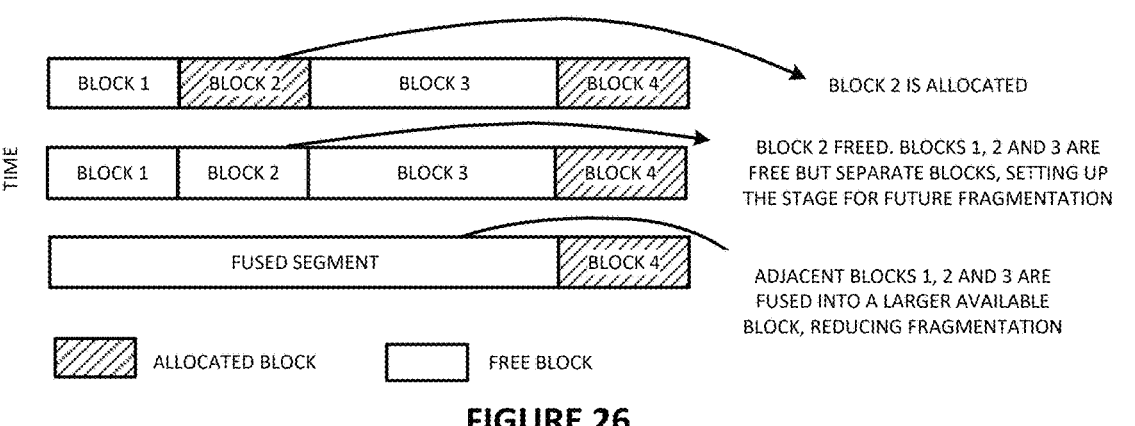
FIGURE 26

SCALABLE MEMORY RESOURCE MANAGEMENT FOR MULTIPLE FORWARDING ENGINE SYSTEMS WITH FUNGIBLE MEMORY SUB-SYSTEMS

§ 1. RELATED APPLICATION(S)

This application claims the benefit of U.S. Provisional Application No. 63/688,229 (referred to as "the '229 provisional" and incorporated herein by reference), titled "SCALABLE MEMORY RESOURCE MANAGEMENT FOR MULTIPLE FORWARDING ENGINE SYSTEMS WITH FUNGIBLE MEMORY SUB-SYSTEMS," filed on Aug. 28, 2024, and listing Swamy Sadashivaiah Renu Kananda, Scott Mackie, and Sreenivas Gadela as the inventors. The scope of the invention is not limited to any requirements of the specific embodiments in the '229 provisional.

§ 2. BACKGROUND

§ 2.1 Field of the Invention

The present application concerns devices used in communications networks, such as routers and/or switches for example. More specifically, the present application concerns managing memory in a packet forwarding part of such devices.

§ 2.2 Background Information

Please note that the disclosure in this section is not an admission of prior art.

§ 2.2.1 Parts of an Example Router

The present application concerns managing memory in a packet forwarding part of a data forwarding devices, such as routers and switches for example. Nodes in a data communications network may be data forwarding devices, such as routers for example. FIG. 1 illustrates two data forwarding devices 110 and 120 coupled via communications links 130. The links may be physical links or "wireless" links. The data forwarding devices 110,120 may be routers for example. If the data forwarding devices 110,120 are example routers, each may include a control component (e.g., a routing engine) 114,124 and a forwarding component 112,122. Each data forwarding device 110,120 includes one or more interfaces 116,126 that terminate one or more communications links 130.

Although routers and their components are generally understood by those skilled in the art, major components of an example router, as well as their functions, are described.

The control component (also referred to as "the control plane") 114,124 functions to discover the network's topology and compute loop-free, optimal routes. It is where routing protocols, such as Open Shortest Path First (OSPF), Intermediate System-Intermediate System (IS-IS) and Border Gateway Protocol (BGP), and signaling protocols, such as Resource reSerVation Protocol (RSVP) and Label Distribution Protocol (LDP), run and where the routing tables (also referred to as Routing Information Bases (RIBs)), including multicast reverse path checking tables and Virtual Routing and Forwarding (VRF) tables, are instantiated and populated. The control plane includes the kernel and daemons. The control plane may also provide an interface for configuring and monitoring the router.

The control plane, usually implemented on a Routing Engine (RE), which is also known as a Supervisory Engine, a Route Processor, among other names, is based on an operating system, called a Network Operating System (NOS) (such as Junos from Juniper Networks, Inc. of Sunnyvale, CA). The RE runs on a general purpose processor because the computational and memory resources it requires are complex. Consequently, a software implementation is preferred. The control plane can be thought of as the router's brain and its computational element.

The forwarding component (also referred to as "the forwarding plane") 112, 124 functions to transfer data packets from an ingress interface (port) to an egress interface (port) so as to move each packet a hop closer to its ultimate destination. By traversing a chain of forwarding plane instances, each contained within a router, a data packet completes its trip from source to destination. Unlike the control plane, which only looks at control (such as OSPF Link State Updates and RSVP-TE PATH and RESV messages) and management packets (such as SNMP messages), each and every packet arriving at the router is processed by the forwarding plane.

A proper understanding of the networking dynamics calls for establishing a clear distinction between what is relevant to routing time (also called convergence time) versus what is relevant to forwarding time. To begin with, mapping the topology and computing loop-free paths is the function of the router's control plane. The forwarding plane gets the routes from the control plane and trusts them. (Lacking the global topological view, the forwarding plane has no way to decide on whether or not they are loop-free or optimal.) On the other hand, when (equal cost) multiple paths (next hops) exist (i.e., when Equal Cost Multi Path or ECMP is present), even though the routing plane identifies them and pushes them to the forwarding plane, the routing plane doesn't decide on the specific next hop taken by each particular flow of packets. This load balancing decision is taken at forwarding time by the forwarding plane. When an action needs to be taken near instantly (e.g., at line speed), it is to be taken at the forwarding plane. Local protection mechanisms depend on installing backup paths in the forwarding plane so that they may be immediately enacted without waiting for the lengthy traditional Interior Gateway Protocol (IGP) convergence that takes place in the control plane.

The control plane's main function, in addition to providing an interface to manage the router, is to program the forwarding plane with the information required to do its job in the form of a table mapping network destinations to egress interfaces. This table is known as the Forwarding Information Base (FIB), or the forwarding table.

Although the control plane and the forwarding plane used to share resources, today they are typically separated. The separation ensures that the forwarding of packets is not impacted by surges of control activity in the control plane and even continue during brief periods of control plane instability or unavailability. With a Software Defined Network (SDN) approach to networking, the control plane doesn't have to be bundled with the forwarding plane in a single box. Rather, the control plane be provided remotely and command the forwarding plane over the network. In such a context, the control plane element is called a "controller" and may centrally preside over a number of forwarding machines in the network, using a variety of new "SDN" protocols (such as OpenFlow or Path Computing Element Protocol (PCEP), for example). With such an arrangement, the controller can provide network operators and administrators with an abstract, holistic view of the network and enable its programming via an interface called a Northbound Interface. The controller could leverage its global, complete view of the network to provide optimization and agile provisioning. The SDN evolution facilitates control plane programmability.

The forwarding component 112,122 may be, or many include, a Packet Forwarding Engine (PFE). Functions, basic workings, components and features of an example PFE are discussed with reference to FIG. 2.

A router can be thought of as a packet switching device. It is a node in a communications network topology. A router receives a packet on an inbound interface (the ingress interface), looks at the destination address in the packet's header, and determines, based on that, the outgoing interface (the egress interface). The actual packet movement from an ingress (input) interface to an egress (output) interface is commonly referred to as "forwarding." Therefore, a router, thus, may also be called a "forwarder."

Referring to FIG. 2, in addition to a chassis and power supplies (not shown), a router 200 typically includes a Routing Engine (RE) 210, a set of linecards 240/280, and a switch fabric 260. The RE 210 embodies the control plane. The set of linecards 240/280 interconnected by the switch fabric 260, together represent the forwarding plane (also called the data plane). Each linecard 240/280 hosts the network ports (router interfaces) 250/290 that send and receive traffic (e.g., packets), to and from links, and one or more ASIC (Application Specific Integrated Circuit) chips or chipsets (chip complexes), each called a Packet Forwarding Engine (PFE) 230/270. The forwarding intelligence, the ability to parse and understand packet headers, lies in the PFE 230/270.

The PFE 230/270 is the centerpiece of the forwarding plane. It is implemented typically as an ASIC chip or a chipset residing on a linecard 240/280. Although the PFE 230/270 could also be implemented as a piece of code as in virtualized platforms, the following discussion focuses on hardware PFEs 230/270. The PFE 230/270 is the component that "understands" packets in that it can decode their headers. In essence, the PFE 230/270 is a header processing and forwarding lookup engine. The PFE 230/270 houses the FIB (forwarding table) mentioned earlier and uses it, upon inspecting the packet's header, to determine to which egress port the packet is to be sent. Each entry in the FIB is a masked prefix (that is, a network address coupled with a string of bits that indicate which bits of the address are the network part).

Even though multiple entries can match the destination address in a packet, the most specific match is chosen. Seeking the best matching entry (that is, the longest, the most specific) in the FIB is called a "route lookup" (even though it is actually a forwarding lookup). The process of seeking the most specific match is known as the Longest Prefix Match (LPM). In case of ECMP, as highlighted earlier, the PFE 230/270 will select one of the outgoing interfaces.

When the PFE 230/270 receives a packet, it places the packet in a temporary memory block called a "buffer", inspects its destination address, looks for an LPM for the destination in the FIB (forwarding table) and determines, accordingly, the next hop and the outgoing interface. It then performs some processing to the packet's header and forwards the packet towards its destination. Referring to FIG. 2, the side that connects the PFE 230/270 to the network ports 250/290 is called its "WAN Side," while the side that connects the PFE 230/270 to the switch fabric 260 is called its "Fabric Side." (This description is simplified, as the packet actually arrives encapsulated in a frame (an Ethernet frame most commonly) with layer 2 headers and trailers. Upon entering the PFE 230/270, these are error-checked and stripped away before the packet is processed. Before leaving the router, a layer 2 header and a trailer are also added to the packet.)

From the description above, it is clear that the PFE 230/270 contains a buffer memory to hold packets, a memory element for holding the FIB and a lookup module 244 that maps the destination address of the packet to a next hop or a set of next hops in the case of load balancing over equal cost multipath (ECMP). Functional blocks of the PFE 230/270 are described below.

A main component of the PFE 230/270 is the routing Lookup Block 244, known also as the Route Block, L Block, R Block, LU Block, etc. The Lookup Block 244 hosts the FIB (the real FIB, that actually forwards packets). The FIB constructed in the RE 210 is a copy that gets downloaded to the PFE 230/270 in order to be actionable. The FIB is a table in that it hosts a list of data. In implementation, it is usually a tree-like structure, called a "trie" (coming from the word retrieval and pronounced tree) stored in a fast Dynamic RAM variant (such as Reduced Latency RAM or RLDRAM). (Employing a trie on RLDRAM is not the highest performance option but the most scalable one given the enormous size routing tables (e.g., hundreds of thousands of entries or even a couple of millions). Ternary Content Addressable Memory (TCAM) is much faster in doing LPM but is complex, has a high power consumption and takes up a large area on the chip.)

The Lookup Block 244 is also used to identify the logical interface (called an "ifl" or a "unit" by Junos and a "sub-interface" by other Network Operating Systems) that the packet arrived on. (Note that modern routers pretend that each packet arrives not on the physical interface but on a virtual interface contained within it.) The determination of an ifl is usually based on a demultiplexing field within the packet, such as a VLAN ID. Each of these ifls is treated as a full-fledged interface in that it gets an IP address and is associated with services such as firewall filters (access lists or ACLs), policers and/or classifiers.

The Memory Block 246 of the PFE 230/270 is a buffer that hosts packets arriving to the PFE from the WAN Side. It is usually the PFE block to which all other blocks are connected. Commonly, it is implemented using a fast memory type called Static RAM (SRAM). It is called the Buffer Block, Memory block, B Block, M Block, XM Block or MQ (as it can do some basic, port level queueing) or other names alluding to its function. The Memory Block 246 queues packets and manages their dequeuing into the switch fabric 260 or out to the network ports 250/290. It extracts the packet's header and feeds it to the Lookup Block 244 to determine where the packet should be sent.

Another function usually done by the Buffer (Memory) Block is "cellification." Switching hardware can be better optimized when the data units are of fixed size. Therefore, packets, which are of variable length, are typically divided into short, fixed-sized pieces called cells (or J-Cells in a Juniper Networks router). This cellification is conducted by the PFE 230/270 (typically by the Memory Block) before the route lookup is performed and before the packet is sent over the switch fabric 260 (or towards other WAN interfaces in same PFE 230/270).

The first J-Cell (the one that contains the header and determines the packet's forwarding destiny) is called a Notification Cell (NC). The remaining J-Cells are called Data Cells (DCs). This cellification happens as soon as the packet is received and initial layer 2 processing is completed. Only the Notification Cell is read into the Lookup (Route) Block 244 (the Notification Cell is sometimes called the packet's HEAD). The Data Cells (constituting the packet's TAIL) wait in a buffer for the Notification Cell to be processed and the next hop to be determined. After that, the Data Cells stream through the PFE 230/270 or through the PFE 230/270 and switch fabric 260 to the outbound interface (undergoing a second lookup if that interface is on a different PFE). The cells are reassembled into a packet before they leave the egress PFE 230/270.

In some designs, interfaces are not connected directly to the Buffer Block but are connected to an Interface Block (called I Block, XI Block, etc.) 242 that sits between interfaces and the Memory Block (see the diagram) 246. In such cases, functions usually performed by the Buffer Block such as queueing (and handling oversubscription) are delegated to the Interface Block 242. In some PFE designs, there is a Fabric Block (called F Block, XF Block, or a variation thereof) that serves as an mediator between the Memory Block 246 and the switch fabric 260.

Basic Queueing, which determines the order of servicing packets and the priority and resources (such as bandwidth and buffer space) allocated to each packet, is handled by the Memory Block 246, as mentioned above (and for that reason, it is sometimes called MQ). Some applications require more granular queueing to deal with multiple subscribers served by a single port. In such applications, queueing calls for an additional block called the Queueing Block 248, which provides multi-level hierarchical Class of Service (CoS) and queueing.

To reiterate, the forwarding lookup is an important function of the PFE 230/270. This is complemented by some layer 2 processing, which usually involves associating the packet with an ifl (a logical interface, a unit or a sub-interface). The lookup includes a Media Access Control (MAC) address lookup, which identifies the MAC address of the next hop. Sometimes it includes a label lookup as well (for MPLS traffic).

To enable more flexibility and granularity in traffic engineering, forwarding is not confined to destination-based forwarding. The forwarding of a packet by the PFE 230/270 can consider other packet fields such as the source address, the value of the TOS (Type of Service) Byte and the UDP and TCP port numbers. Forwarding based on such fields may be referred to as Filter-based Forwarding (FBF), Policy-based Routing (PBR), etc. With FBF, the FIB will contain a mapping between, not only destination addresses, but also other packet fields (called Keys) and next hops.

In addition to the inclusion of more packet fields in the forwarding decision process, labels were introduced into the packet switching world by the advent of Multi-Protocol Label Switching (MPLS). With the advent of MPLS, the FIB became a place for storing label forwarding entries as well as prefixes. When a labeled packet arrives at PFE 230/270, its upper (outermost) label is inspected and a matching entry is sought in the FIB using a hash table. The matching entry will indicate the next hop. The next hop will specify the outbound interface, the MAC address of the interface of the next router along the path in addition to a label operation and a label value if the operation is a swap or push. In most transit routers, this operation is a label swap operation, but could also be a label pop, a label push, or a combination of operations, depending on the router's location within the topology and the services (such as local protection or fast reroute) it is offering.

In addition to Policy-based routing and MPLS, new forwarding functions, called forwarding services (or simply services), may be incorporated into the PFE 230/270 to achieve various performance, security and monitoring objectives. With the introduction of services demand from the PFE 230/270 became more than the relatively simple lookup and forward sequence. Services are additional functions, which are mostly handled by the Lookup Block 244, that either manipulate the packet's header, the entire packet or determine whether the packet is to be forwarded or not, how fast the packet is to be forwarded and how much resources are allocated to servicing the packet such as bandwidth and buffer space. Some services, such as multicast and sampling don't change packets. Some services, such as network address port translation (NAPT), manipulate addressing and port fields located in the header. Some services such as Internet Protocol Security (IPSec) encryption, radically change packets and their headers. Services required to offer Class of Service (CoS) may include classification, policing, filtering, scheduling (forwarding prioritization and bandwidth allocation), shaping and marking (coloring).

Encapsulation and decapsulation, needed for tunneling (such as Generic Routing Encapsulation (GRE) tunneling, IPSec encapsulation or the multicast-in-unicast tunneling required as part of Protocol Independent Multicast-Sparse Mode (PIM-SM) operation) are also additional services that may be required from the PFE 230/270. In the past, many of these services, such as NAPT, tunneling, sampling and flow export (jflow), necessitated the use of special linecard or module. Today, the lookup block 244 of the PFE 230/270 is capable of doing most of these services (service are called "inline", when done by the Lookup Block 244 in the PFE rather than a dedicated hardware module).

To summarize, a PFE 230/270 performs route, flow, MAC and label lookups, in addition to classification, scheduling (queueing and dequeuing), policing, filtering, accounting, sampling, mirroring, unicast and multicast reverse path checking, class-based routing, packet header re-writes, coloring (marking), encryption, decryption, encapsulation, and decapsulation. More recently, the latest PFEs 230/270 can do telemetry and even participate in the generation of packets for bi-directional forwarding detection (BFD), a lightweight liveness protocol for rapid link failure detection).

The following describes a data packet (not a control packet) in its journey through the example router. A packet is received on an ingress physical interface (built on or pluggable module). This is typically associated with the conversion from optical signaling to electrical. The received packet is then transferred to the PFE 230/270 through the PFE's WAN side. Next, the packet is stored in a Memory Block (buffer) 246 in the PFE 230/270. Layer 2 (Link Layer) frame encapsulation is processed. (This involves error checking, identifying the encapsulated protocol (whether the packet is IPv4, IPv6 or MPLS) and stripping out the layer 2 headers.) The packet is typically chunked into cells. The packet's header (HEAD) is sent to the Lookup Block 244 (typically in the form of a Notification Cell), where the destination address in the packet is mapped to an egress interface by looking up the address (or the label, if MPLS or Segment Routing (SR) is used) in the forwarding table. The Lookup Block 244 may also determine the destination MAC address it should have upon leaving the router 200. The Lookup Block 244 may also be responsible for identifying the logical interface (ifl) the packet belongs to and applying any of the services discussed above, such as network address translation, policing and the like. (Recall that an ifl is a virtual construct with no physical manifestations. Identifying a packet as belonging to an ifl means that this packet will be processed according to the parameters associated with that ifl (such as multi-field classification or filtering). In a way, the ifl is a packet processing profile. For the outside world, only physical interfaces (ifd's) are real. Determining the ifl the packet belongs to is based on some demultiplexing field, typically the VLAN ID.)

The lookup may result in multiple valid next hops (such as, for example, Equal Cost Multi Path (ECMP) interfaces). In such a case, a single egress interface is selected based on a hashing value computed from the fields in the packet (called hashing keys), ingress Interface and/or other parameters. Using a hash ensures that packets belonging to the same flow follow the same path in order to avoid being reordered. The value in the packet's Time To Live (TTL) is decremented and the checksum field is recomputed (if the packet is an IPv6 packet, then the Hop Count is decremented and there is no checksum field).

Note that the egress interface determined by the lookup could be in the same PFE 230/270, same linecard 240/280 but on a different PFE 230/270, or in different linecards 240/280 altogether. If the egress interfaces is on the same PFE 230/270, then it is sent to it directly where it gets encapsulated in a layer 2 frame and put into the link. If the egress interfaces is on another line card, then the packet is transmitted, via the switch fabric 260, to that other linecard 240/280 where another lookup takes place.

The foregoing description of processing a data packet is simplified in that it assumes that a route exists for the packet, that the frame is not corrupted, the TTL is larger than 1 and that no services other than unicast forwarding are required (no multicast, no sampling, no classification, no rate limiting, no filtering and no address translation). It also assumes no Ethernet frame.

Today, a PFE 230/270 is a specialized piece of silicon-ware implemented as an Application Specific Integrated circuit (ASIC), a set of ASICs or based on a specialized type of processor called an NPU (Network Processor Unit). An NPU can be thought of as a programmable PFE 230/270 that has some fundamental forwarding primitives burned-in (built-in), while at the same time being programmable via what is known as microcode. Generally speaking, a more hardwired the design has higher performance, but less flexibility to add features.

A linecard 240/280 is engineered to host one or more PFE complexes that are typically fixed on the linecard. Interfaces (ports) 250/290 hosted on the linecard may be built-in or modular. Juniper Networks calls a card that carries interfaces, a Physical Interface Card (PIC). A linecard is called a PIC Concentrator (PC). Linecards for some early platforms were called Flexible PIC Concentrators (FPC), Dense PIC Concentrators (DPCs), MPC (Modular PIC Card), etc. In some example routers, a linecard hosts one, two or a handful of PFE complexes. Utilizing multiple PFEs in a linecard is a way of reusing an existing PFE to scale the capacity of the PFE.

The word "PFE" is sometimes used to refer to the chipset, sometimes to all PFE complexes on a certain linecard and sometimes (very loosely) to the entire forwarding plane, which typically includes more than a PFE (two for unicast, more for multicast) in addition to the fabric.

§ 2.2.2 Forwarding Plane Components and their Limitations

The present application concerns the memory of a PFE ASIC that uses a single fungible memory space for both ingress and egress processing. FIGS. 4 and 5 illustrates a router component with one or more PFE planes 410, with each plane housing an N-PFE complex, with each PFE 310 driven by such an ASIC, and each PFE plane 410 managed by a single CPU 420. Static allocation of memory resources for ingress and egress sides is sub-optimal for such an ASIC. Static allocation can be problematic in a system which needs far more egress or far more ingress, and configuration is not known ahead of time, especially with dynamic routing and SDN Controllers. An adaptive system which adapts to the configuration would be useful.

§ 3. SUMMARY OF THE INVENTION

Example implementations consistent with the present description provide a single controller (e.g., single CPU) processing memory allocations from multiple PFEs, and it's managing this N-PFE complex simultaneously, with the same memory view. A single CPU may be used to drive multiple PCI express forwarding chips on a large scale.

In a system having a plurality of packet forwarding engines (PFEs), each PFE having a memory, each of the memories having a plurality of blocks, and each of the blocks having a plurality of words, a method for managing the memories of the PFEs is provided. In one implementation, the method includes (a) receiving a request to allocate memory to store an ingress instruction; (b) responsive to receiving the request to allocate memory to store an ingress instruction, (1) allocating, from among unallocated blocks, one or more common words in each of the memories to the ingress instruction, and (2) writing the ingress instruction to the allocated one or more common words in the memory of each of the plurality of memories; (c) receiving a request to allocate memory to store an egress instruction associated with one of the PFEs; and (d) responsive to receiving the request to allocate memory to store an egress instruction associated with a given PFE, (1) allocating, from among unallocated blocks, a common block in the memory of the given PFE associated with the egress instruction so that the common block in the memory of the given PFE with which the egress instruction is associated, is indicated as being "in-use", (2) writing the egress instruction to the allocated common block of only the given PFE with which the egress instruction is associated, and (3) indicating the allocated common block in the memory of each of the remaining PFEs as being available, but not in use.

In some implementations, the example method further includes: (e) receiving an indication that the ingress instruction is complete; and (f) responsive to receiving the indication that the ingress instruction is complete, (1) freeing the one or more common words in each of the memories, (2) determining whether or not the block storing the freed words is totally free, and (3) responsive to determining that the block storing the freed words is totally free, freeing the block for future storage of any one of an ingress instruction or an egress instruction by making it unallocated, and otherwise, responsive to determining that the block storing the freed words still has allocated words, allowing the freed words of the allocated block to be used to store words of another ingress instruction but not of another egress instruction.

In some implementations, the example method further includes: (e) receiving an indication that the egress instruction is complete; and (f) responsive to receiving the indication that the egress instruction is complete, (1) freeing the word(s) storing the egress instruction from the block, (2) determining whether or not any other words in the allocated common block are in use, and (3) responsive to determining that there are no other words in the allocated common block in use, indicating that the common block as being available, thereby freeing the common block in the memory of the given PFE with which the egress instruction is associated for storage of another egress instruction. In some such implementations, responsive to determining that there are no other words in the allocated common block in use, the example method further includes determining whether or not the common block is in use by any PFE, and responsive to determining that the common block is not in use by any PFE, indicating that the common block is unallocated whereby the common block is recycled for future use by any PFE for any one of an ingress instruction or an egress instruction.

In some implementations, the ingress instruction is selected from a group of instructions including (A) identifying an outgoing interface for a packet, (B) identifying an outgoing port for a packet, (C) popping a label from a packet, (D) swapping a label of a packet, (E) adding a label to a packet, (F) packet classification, (G) packed scheduling, (H) packet policing, (I) packet filtering, (J) packet accounting, (K) packet sampling, (L) packet mirroring, (M) unicast reverse path checking, (N) multicast reverse path checking, (O) class-based routing, (P) packet header re-writes, and (Q) packet marking.

In some example implementations, the egress instruction is selected from a group of instructions consisting of (A) next hop determination, (B) Ethernet header addition, (C) label addition, (D) tunnel header addition, (E) encapsulation, and (F) maximum transmission unit (MTU) check.

An example arbiter method includes: (a) receiving a request for a block allocation from a first allocator associated with a first PFE; (b) responsive to receiving the request, (1) determining whether or not a block is available, and (2) responsive to determining that a block is available, changing a status of the block from "available" to "in use", and otherwise, responsive to determining that a block is not available, requesting a block allocation from a master allocator associated with all of the PFEs; (c) receiving from the master allocator, a block allocation; and (d) responsive to receiving a block allocation, (1) adding the allocated block to an In-Use list associated with the first PFE (or more generally, changing a state of the allocated block to "in use" by the first PFE), (2) adding the allocated block to an Available list associated with each of the plurality of PFEs other than the first PFE (or more generally, changing a state of the allocated block to "available" to each of the plurality of PFEs other than the first PFE), and (3) returning the block allocation to the first allocator associated with the first PFE.

In some such arbiter methods, the request for a block from the first allocator associated with the first PFE was triggered by a request from an application for words to store an egress instruction, and the application writes the egress instruction to the memory of the first PFE at the allocated block.

In some such arbiter methods, the egress instruction is selected from a group of instructions consisting of (A) next hop determination, (B) Ethernet header addition, (C) label addition, (D) tunnel header addition, (E) encapsulation, and (F) maximum transmission unit (MTU) check.

Some implementations of the arbiter methods further include (e) receiving a request for another block allocation from a second allocator associated with a second PFE; (f) responsive to receiving the request, (1) adding the allocated block from the Available list associated with the second PFE to the In-Use list associated with the second PFE, and (2) returning the allocated block to the second allocator. In some such arbiter methods, the request for a block allocation from the second allocator associated with the second PFE was triggered by a request from an application for words to store an egress instruction, and the application writes the egress instruction to the memory of the second PFE at the allocated block.

In some arbiter methods, the egress instruction is selected from a group of instructions consisting of (A) next hop determination, (B) Ethernet header addition, (C) label addition, (D) tunnel header addition, (E) encapsulation, and (F) maximum transmission unit (MTU) check.

A memory management system is provided for use in a system having a plurality of packet forwarding engines (PFEs), each having a memory, each of the memories having a plurality of blocks, and each of the blocks having a plurality of words. The memory management system includes: (a) a master allocator configured to (1) receive a request for a memory block or word allocation from an application, and (2) responsive to receiving the request, return an allocation of memory block or word to the application; (b) a per-PFE allocator associated with each of the PFEs, each configured to (1) receive a request for a memory block or word allocation from an application, (2) responsive to receiving the request, request a memory block allocation from an arbiter, (3) receive a memory block allocation from the arbiter, (4) allocate a word from the memory block allocation, and (5) return the block and word allocation to the application; (c) the arbiter configured to (1) maintain, for each of the PFEs, a list of In-Use memory blocks and a list of Available memory blocks, and (2) act as an intermediary between each of the per-PFE allocators and the master allocator; and (d) the application configured to (1) generate ingress instructions and egress instructions, (2) write ingress instructions to one or more allocated words common in the memory of all of the PFEs, and (3) write egress instructions to an allocated block in the memory of a specific one of the PFEs.

In some implementations of the example memory management system, the master allocator and arbiter can allocate words of any free block to an ingress instruction and any free block to an egress instruction.

In some implementations of the example memory management system, the ingress instruction is selected from a group of instructions including (A) identifying an outgoing interface for a packet, (B) identifying an outgoing port for a packet, (C) popping a label from a packet, (D) swapping a label of a packet, (E) adding a label to a packet, (F) packet classification, (G) packed scheduling, (H) packet policing, (I) packet filtering, (J) packet accounting, (K) packet sampling, (L) packet mirroring, (M) unicast reverse path checking, (N) multicast reverse path checking, (O) class-based routing, (P) packet header re-writes, and (Q) packet marking.

In some implementations of the example memory management system, the egress instruction is selected from a group of instructions consisting of (A) next hop determination, (B) Ethernet header addition, (C) label addition, (D) tunnel header addition, (E) encapsulation, and (F) maximum transmission unit (MTU) check.

In some implementations of the example memory management system, the master allocator, each of the per-PFE allocators, the arbiter and the application are software modules executed by a common controller unit. In some such implementations, the common controller unit is a single, multicore, central processing unit (CPU).

In some implementations of the example memory management system, the master allocator, each of the per-PFE allocators, the arbiter and the application, and each of the plurality of PFEs are provided on a line card on a chassis-based switch or chassis-based router.

In some implementations of the example memory management system, each of the plurality of PFEs is provided in one or more PFE groups on one or more PFE planes.

§ 4. BRIEF DESCRIPTION OF THE DRAWINGS

FIGS. 21A-21C illustrate allocating a fixed size memory space.

FIGS. 22A-22C illustrate allocating variable size memory spaces.

FIGS. 23A-23C illustrate fusing (coalescing) adjacent blocks of memory.

FIGS. 24A and 24B illustrate an example size dictionary data structure.

FIG. 25 illustrate an example fusing bit-string data structure.

FIG. 26 illustrate fusing (coalescing) free blocks.

§ 5. DETAILED DESCRIPTION

Figure 1:
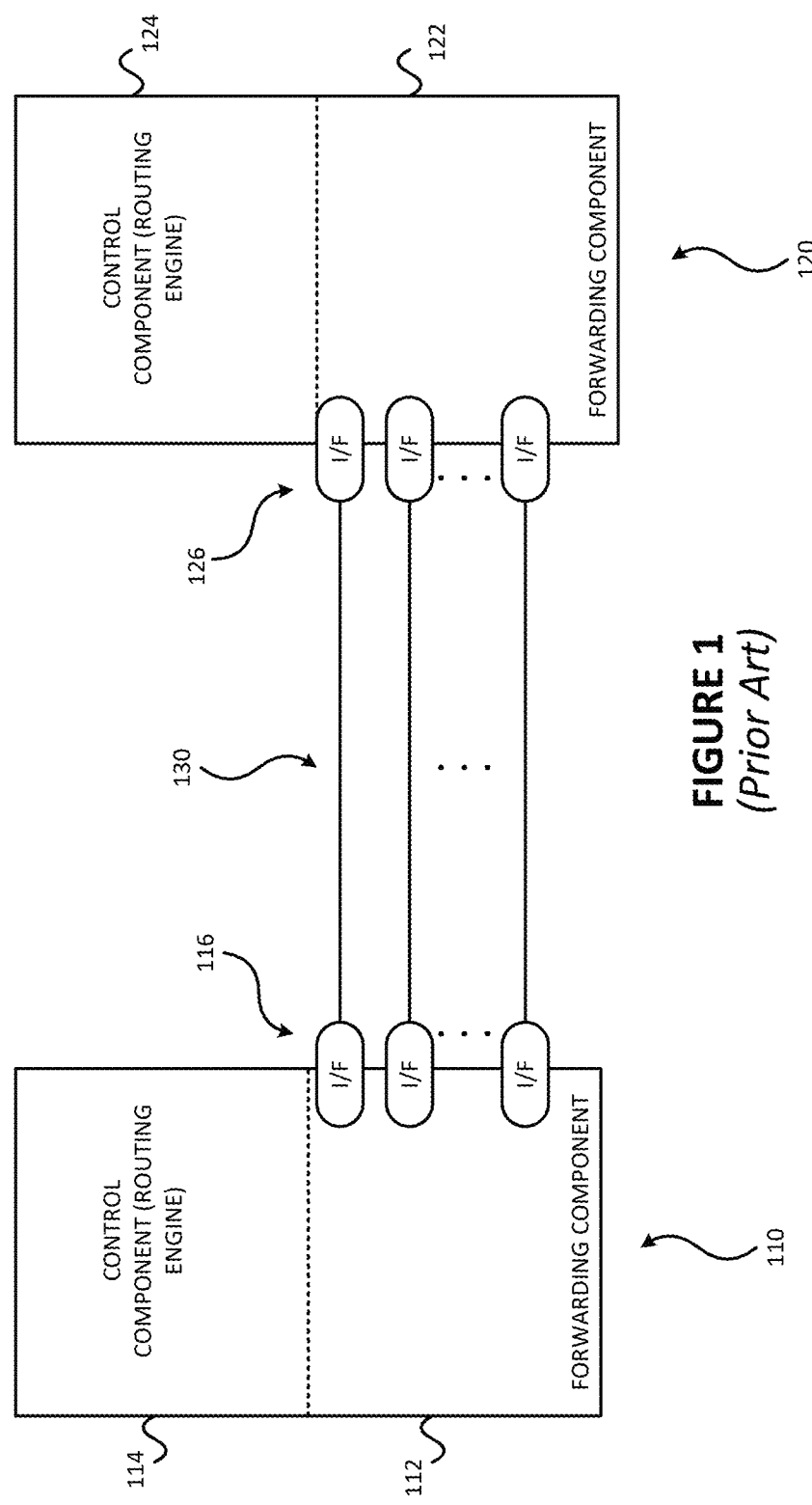
FIG. 1 illustrates example packet forwarding devices (e.g., routers) in which example embodiments consistent with the present description may be implemented.
Figure 2:
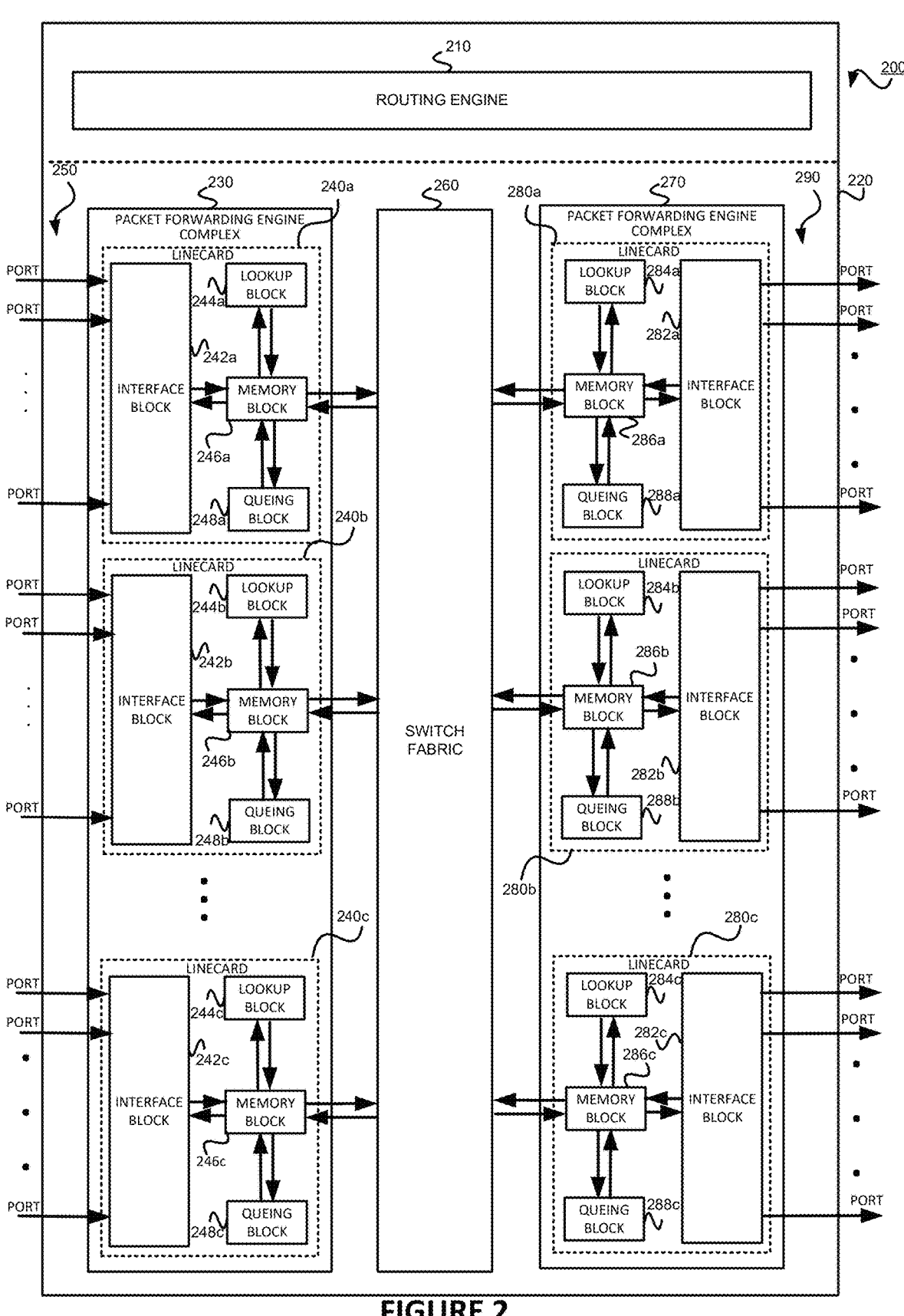
FIG. 2 illustrates an example router in which example embodiments consistent with the present description may be implemented.

The present disclosure may involve novel methods, apparatus, message formats, and/or data structures to manage an ASIC that uses fungible memory space for both ingress and egress processing. The ASIC may include multiple packet forwarding engines (PFEs), each with their own memory. The manager may be a single controller (e.g., a single CPU). The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. In the drawings, the same reference number may be used to denote different implementations of an element or component, or different instances (e.g., different states storing different information) of an element or component. Thus, the present disclosure is not intended to be limited to the embodiments shown and the inventors regard their invention as any patentable subject matter described.

§ 5.1 Definitions

A "network device" includes, but is not limited to, a layer-2 switch, a layer-3 router, or a Transparent Interconnection of Lots of Links (TRILL) routing bridge (RBridge).

"Packet" refers to a group of bits that can be transported together across a network. "Packet" should not be interpreted as limiting embodiments of the present invention to any networking layer. "Packet" can be replaced by other terminologies referring to a group of bits, such as "message," "frame," "cell," or "datagram." Packet may be a group of bits formed per the Internet Protocol (e.g., IPv4, IPv6, etc.).

"Packet Forwarding Engine" ("PFE") is a component or group of components (e.g., ASICs) used to perform packet forwarding (e.g., at high speeds, with high throughput). The PFE may perform interface, queuing, lookup (e.g., packet processing tasks such as route lookup, label lookup, firewall, hashing, header manipulation, parsing, encapsulation, decapsulation, policing/policy enforcement, and/or classification, etc.) and memory (e.g., on-chip and/or off chip) access operations. A PFE is typically arranged between communications link interfaces and switch fabric.

"Peripheral Component Interconnect" ("PCI") is a standard for connecting peripheral devices to a computer's central processing unit (CPU) and memory. For Juniper routers, PCI typically refers to the slot or interface where various network interface cards (NICs) or other hardware modules can be installed to extend the router's functionality. PIC: Physical Interface Card State or Status of Memory Block. A memory block may be "unallocated" or "allocated." An "allocated" memory block may be "available" for use, or "in-use" (and therefore unavailable). An "allocated" memory block that becomes free may be "released" or "recycled," after which it becomes "unallocated."

A "block(s) state indicator" may be a message and/or data structure indicating the state or status of one or more memory block(s). In one example, one or more list data structures may list "unallocated" memory block(s), "allocated" and "available" memory blocks, and/or "allocated" and "in-use" memory blocks.

"Fungible" memory means memory in which blocks can be reused for different purposes. For example, the same block(s) of fungible memory may be used to store, at different times, either "ingress instructions" or "egress instructions." This is even though at any given time, a block may store only ingress instruction(s) or egress instruction(s), but not both. Thus, a fungible memory is not hard partitioned (i.e., not partitioned statically).

"PFE Memory" is a memory that a PFE (or an application controlling one or more PFEs) uses to store and retrieve data it needs to perform a process. More generally, a "memory" is the overall space for storing data and programs. In example implementations consistent with the present description, each PFE has its own memory.

Within a (e.g., PFE) memory, memory "blocks" are smaller, manageable chunks (e.g., fixed size chunks for storing one or more words used in processes performed by the PFE). More generally, a memory block is a set of addresses in a memory or storage device. Typically, there will be multiple memory blocks of a fixed size in a memory or storage device. A "block" of memory includes more than one addressable words. The unit of a block defines a number of addressable words that can be allocated, at a given time, to one of an ingress instruction or an egress instruction, whereby blocks are used to mutually exclude ingress memory from egress memory at any given time.

Memory Block Allocation: The act of reserving a memory block (or blocks) for use by a process or component.

A "word" is a unit of data used by the PFE. Typically, the word is sized so that a fixed number of words fit within a memory block. The size of a word is determined by the architecture of the PFE (e.g., 16 bits, 32 bits, 64 bits, etc.). More generally, a word is a fixed number of bits or bytes in memory. Typically, there will be multiple words (at multiple distinct addresses) in a memory block.

Each block or word of memory is assigned a unique "address" which enables the PFE or application to read data, write data, and erase data.

"Ingress Instructions" and "Egress Instructions" are nexthop instructions that usually follow a route lookup.

"Ingress instructions" are applied to incoming packets. "Ingress instructions" must be programmed on all PFEs because a packet to be forwarded can ingress (enter) the device on any interface from the network (e.g., on any WAN interface serviced by any PFE of any line card).

The ingress nexthop instructions can perform operations such as, for example, identifying an outgoing interface/port, popping a label, swapping a label, adding a label, classification, scheduling (queueing and dequeuing), policing, filtering, accounting, sampling, mirroring, unicast and multicast reverse path checking, class-based routing, packet header re-writes, coloring (marking), etc. "Ingress memory" is memory for storing an ingress instruction(s).

"Egress instructions" are applied before a packet egresses (exits) the device through a WAN port. The packet may have crossed a fabric if ingress and egress PFEs are present in different PFE planes. Egress (nexthop) instructions include, for example, addition of Ethernet header, pushing of MPLS label(s), addition of Tunnel headers, maximum transmission unit (MTU) checks, etc. An egress instruction is applied after the output port is known (e.g., after lookup). "Egress memory" is memory for storing an egress instruction.

A "PFE plane" is a group of more than one PFEs controlled by a common (e.g., single CPU) controller. One example of a PFE plane is a line-card in a chassis based system.

A "fixed pipeline" architecture typically contains ASIC blocks with predetermined fixed functions. For example, the Express family of ASICs from Juniper Networks, Inc. of Sunnyvale, CA used a fixed pipeline architecture in which there is a separate processing block dedicated for route lookup, a separate processing block dedicated for ingress nexthop processing, a separate processing block dedicated for egress nexthop processing, etc. Fixed pipeline architectures are more power efficient, compared to a non-fixed pipeline device. Packets traverse the fixed processing blocks in a fixed sequence.

§ 5.2 Overview

In the following, "requesting a block allocation" (or "block allocation request") may be shortened to "requesting a block" (or "block request," or the like), if appropriate, "receiving a block allocation" (or "block allocation receipt," or the like) may be shortened to "receiving a block" (or "block receipt," or the like), if appropriate, "requesting a word allocation" (or "word allocation request," or the like) may be shortened to "requesting a word" (or "word request," or the like), if appropriate, and "receiving a word allocation" (or "word allocation receipt," or the like) may be shortened to "receiving a word" (or "word receipt," or the like), if appropriate.

There are big, disaggregated networks in which an SDN controller is used to manage multiple PFE planes. (As will be discussed later with reference to FIG. 5.) The SDN Controller doesn't have visibility into the memory subsystem of the PFE planes, and therefore cannot manage this particular aspect of it. So being able to manage the memories across the PFEs is a unique piece about how certain example embodiments are implemented.

Example implementations are not like a system in which the ingress and the egress memory is completely separate. Rather, example implementations have competing requirements from ingress and egress in the same allocator, and handling these competing requirements is challenging.

On the ingress side is functionality that is shared in common across all the PFEs. So, all PFEs use the same ingress instruction. The memory block contains instructions and data. The instructions get executed by the ingress block(s) of all PFEs. On the egress side is functionality that is PFE specific. The memory block again contains instructions and data. The instructions get executed by the egress block of the specific PFE.

Ingress memory is allocated only once for all PFEs. The same address is programmed on all PFEs. This is accomplished using a "master" (or Global) allocator. The memory managed by the master allocator is applicable to all PFEs. Ingress memory follows an "allocate once, write multiple times" model.

On the other hand, egress memory is allocated separately for each PFE. This is a per-PFE allocation model, and is accomplished using a separate allocator for each PFE.

§ 5.3 Example Environment

Figure 4:
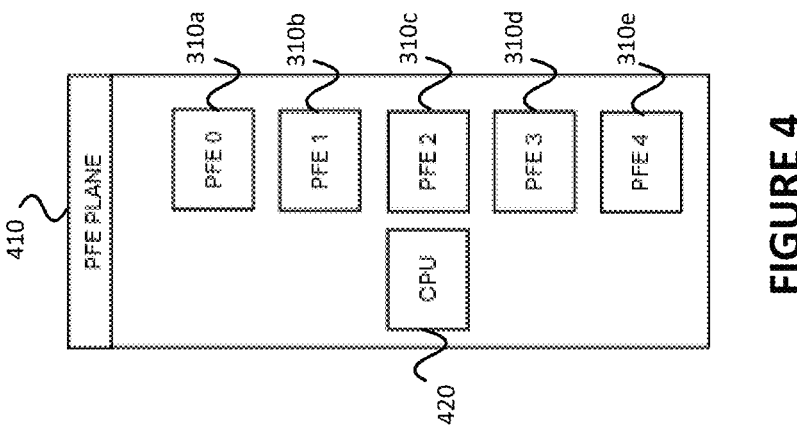
FIG. 4 is a block diagram of an example PFE plane on which a system consistent with the present description may be implemented.
Figure 3:
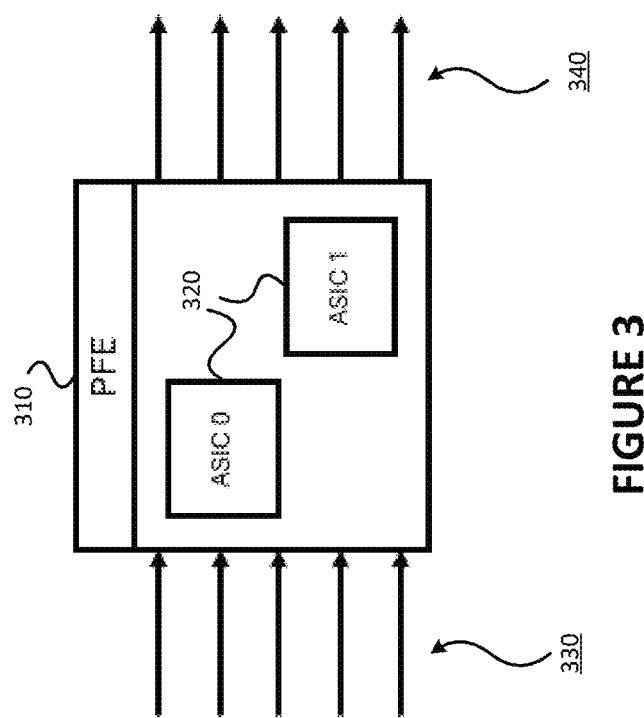
FIG. 3 is a block diagram of an example packet forwarding engine (PFE) that may be used in a system consistent with the present description.
Figure 5:
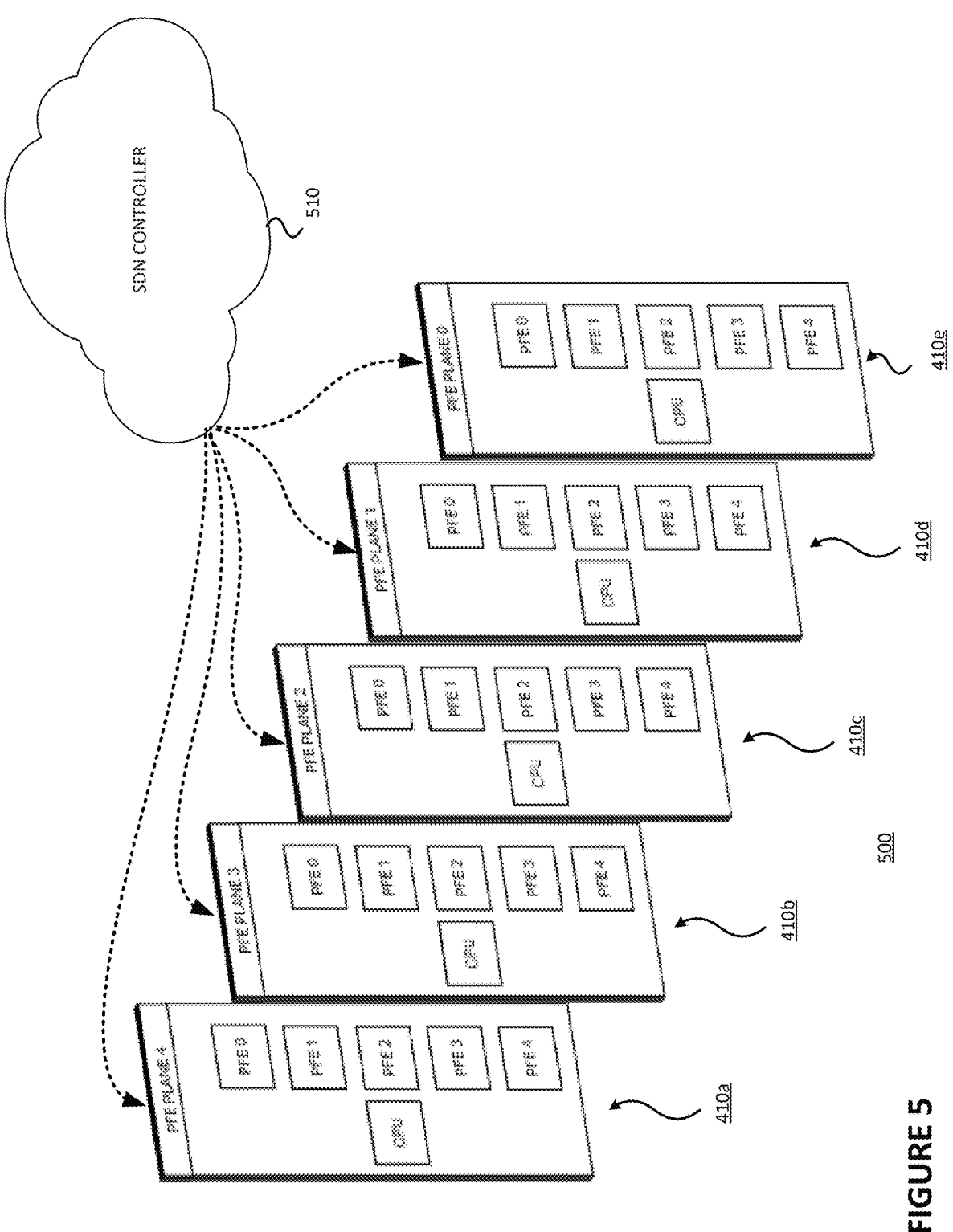
FIG. 5 illustrates multiple PFE planes controlled by a software defined network (SDN) controller.

FIG. 3 is a block diagram of an example packet forwarding engine (PFE) 310 that may be used in a system consistent with the present description. As shown, a PFE 310 houses one or more Network Processing Unit (NPU) ASICs 320. FIG. 4 is a block diagram of an example PFE plane 410 on which a system consistent with the present description may be implemented. As shown, a PFE plane complex 410 houses one or more PFEs 310a-310e. All PFEs are controlled by a single (shared) controller (e.g., a single CPU 420). The controller may have its own non-transitory memory storing processor-executable instructions which, when executed by one or more processors, cause the one or more processors to perform any of the control methods described. FIG. 5 illustrates multiple PFE planes 410a-410e controlled by a software defined network (SDN) controller 510. As noted above, generally, an SDN Controller 510 does not have visibility into the memories of the PFEs.

Figure 6:
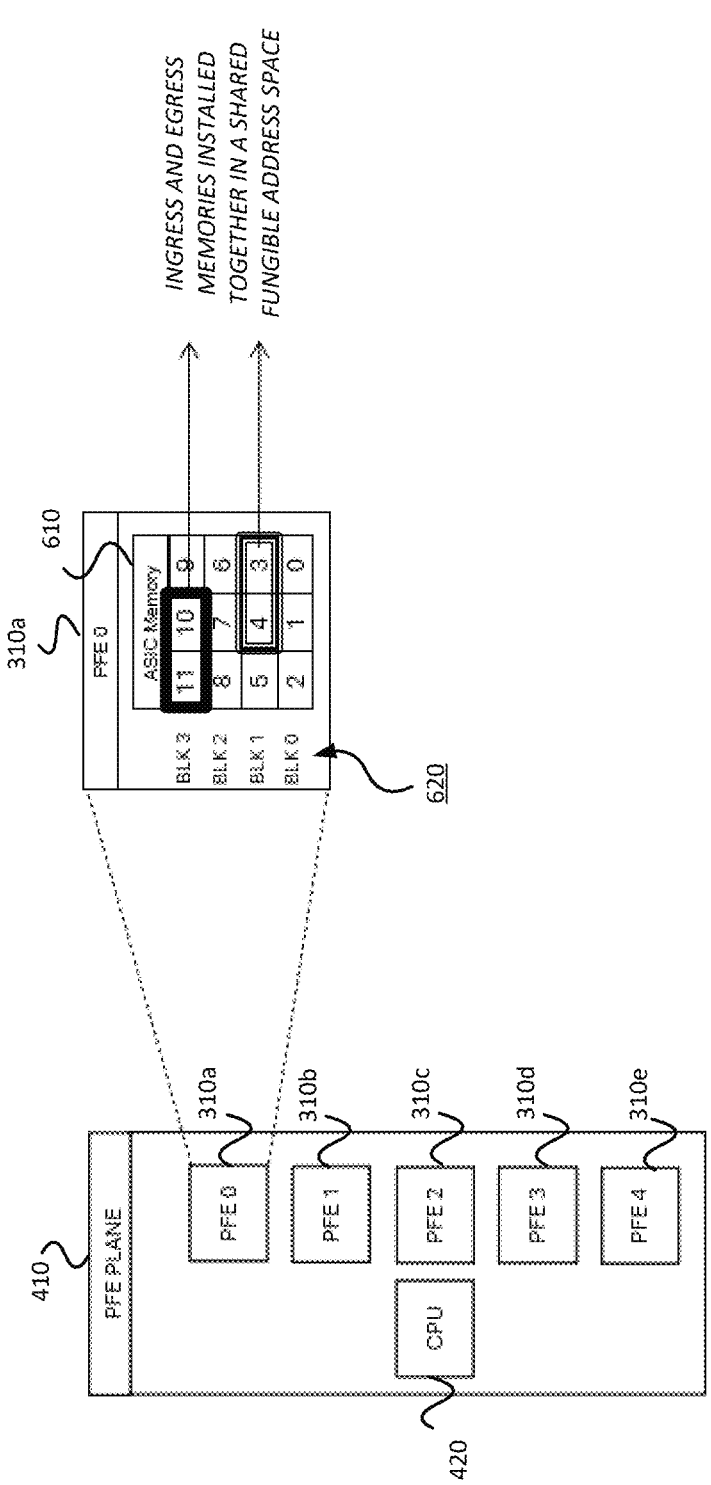
FIG. 6 illustrates shared fungible memory for ingress and egress instructions.

FIG. 6 is a line drawing illustrating shared fungible memory 610 for ingress and egress instructions. In this example, the memory 610 belongs to PFE 0 310a, provided on PFE plane 410. As shown, ingress instructions (words of which are depicted in triple line) and egress instructions (words of which are depicted in bold line) share common fungible memory 610. That is, ingress and egress memories reside together in the same memory space. They do not have separate dedicated memories, or permanently dedicated blocks 620. That is, in example embodiments consistent with the present description, the ingress and egress memories do not have dedicated blocks 620 within the memory 610. For example, once all words of a given block 620 are freed (and the block becomes "unallocated"), the given block 620 may be reused (e.g., reallocated) to store an egress instruction(s) or (if the same block in all PFE memories is "unallocated") the given block 620 may be reused (e.g., reallocated) to store an ingress instruction(s). However, at any given time, a given block may store ingress instructions or egress instructions, but not both ingress and egress instructions.

Figure 7:
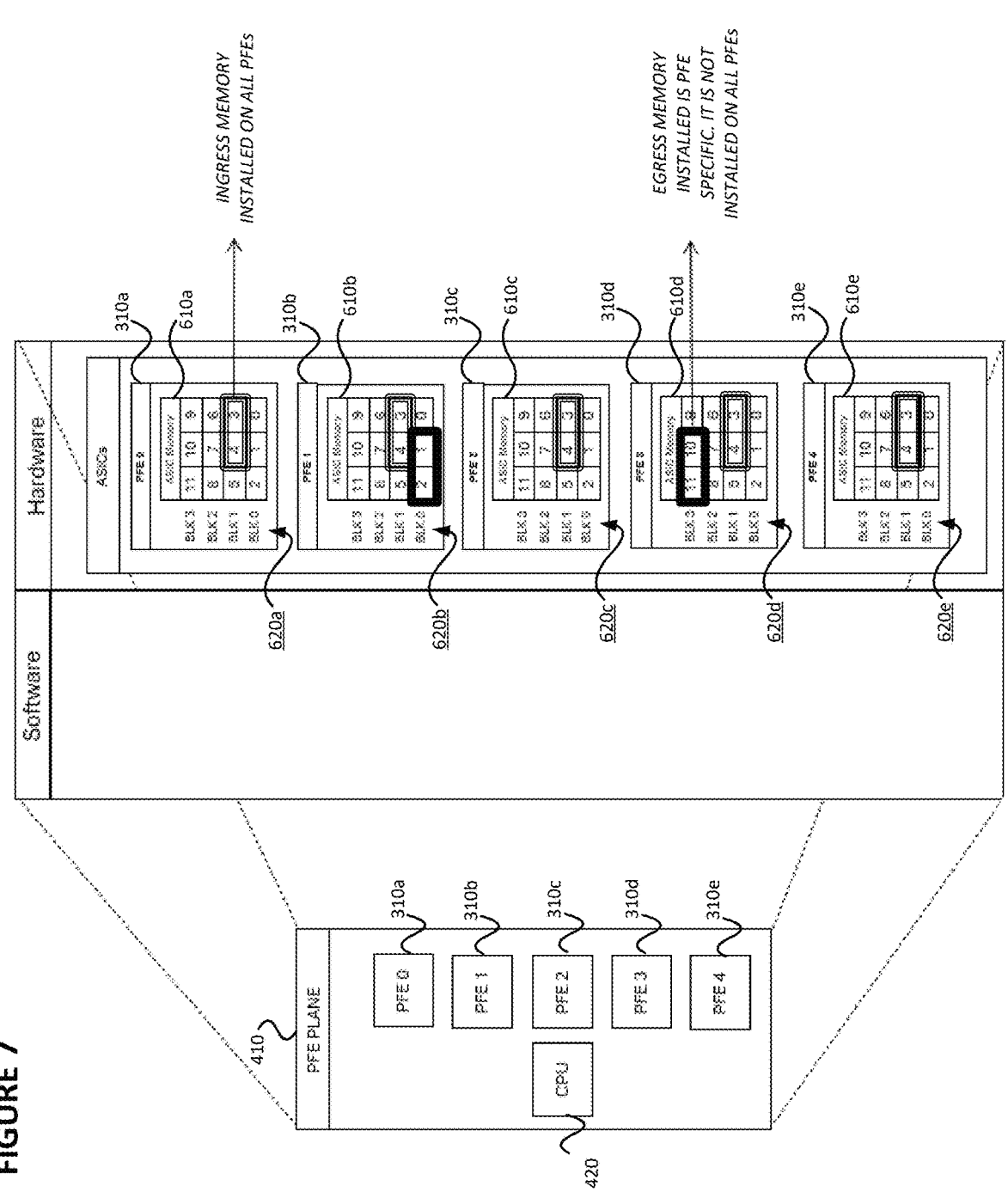
FIG. 7 illustrates a shared fungible memory with a mask.

FIG. 7 is a line drawing illustrating a shared fungible memory 610a-610e with a mask. Words of ingress instructions are depicted in triple line and words of egress instructions are depicted in bold line. Ingress memory has a mask of all "1"s. That is, an ingress instruction is applicable to all PFEs 310a-310e. As shown, a given ingress instruction is replicated in words 3 and 4 of block 1 of the memories 610a-610e of every one of PFE 0 through PFE 4 310a-310e. On the other hand, egress memory is PFE-specific. Only bit(s) corresponding to the specific PFE(s) is turned on. As shown, one egress instruction is stored in words 1 and 2 of block 0 in the memory 610b of PFE 1 310b, while another egress instruction is stored in words 10 and 11 of block 3 of the memory 610d of PFE 3 310d. In this example, a single CPU 420 manages the memories 610a-610e for all PFEs (every one of PFE 0 through PFE4) 310a-310e. Another example is illustrated in FIG. 8.

Figure 8:
FIG. 8 illustrates fungible memory storing an ingress instruction and egress instructions.

FIG. 8 is a line drawing illustrating fungible memory 610a and 610b storing an ingress instruction and egress instructions. Words of ingress instructions are depicted in triple line and words of egress instructions are depicted in bold line. As shown, ingress memory is written to all PFEs 310a-310b. In an example implementation, the CPU is programmed with a "master allocator" 810 and a "per-PFE allocator" 820a and 820b for each PFE 310a and 310b, respectively. The master allocator 810 models ingress memory. Ingress memory is managed by the Master Allocator 810. As shown, every allocation in the master allocator 810 applies to all PFEs 310a-310b. On the other hand, egress memory is PFE-specific. As shown, a separate allocator 820a or 820b for each PFE (each referred to as a "per-PFE allocator," or an "allocator PFE x," or a "PFE-specific allocator") models egress memory. Egress memory is written to only one PFE 310a or 310b.

Figure 9:
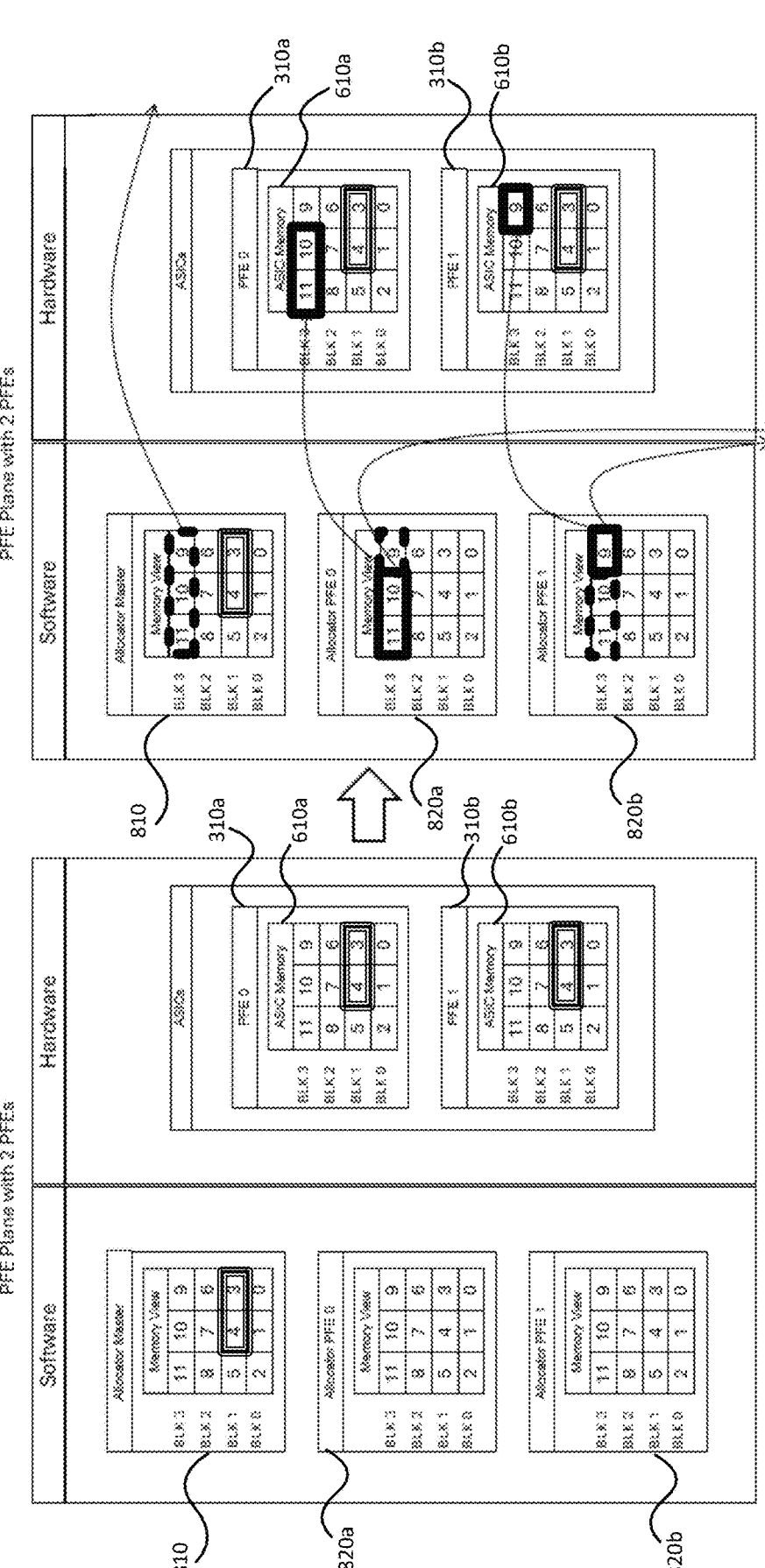
FIG. 9 illustrates mutual exclusion.

Finally, FIG. 9 is a line drawing illustrating mutual exclusion. Words of ingress instructions are depicted in triple line and words of egress instructions are depicted in bold line. The allocation of words is depicted in bold dashed line. Although memory blocks are fungible and may store, at any given time, either an ingress instruction or an egress instruction (but not both ingress and egress instructions at the same time), memory blocks are used to enforce "Mutual Exclusion." That is, ingress and egress memories are mutually exclusive, whereby, at any given time, ingress memory cannot use egress memory locations, and vice-versa. As just noted above, exclusion is enforced through blocks. In one example implementation, per-PFE allocators 820a and 820b must first obtain a block allocation (e.g., indirectly) from the master allocator 810, before allocating egress memory. Recall that a separate allocator for each PFE models egress memory, and that egress memory is written to only one PFE. In this example, master allocator 810 allocates block 3 for use by per-PFE allocators 820a and 820b. Per-PFE allocators 820a and 820b are now free to allocate memory from block 3. More specifically, per-PFE allocator 820a allocates two words starting at address 10 (within block 3), and per-PFE allocator 820b allocates one word at address 9 (also withing block 3). Note that although PFE 0 310a uses words 10 and 11 of block 3 for one egress instruction, and PFE 1 310b uses word 9 of block 3 for another egress instruction, different PFEs can use the same words within a block for different egress instructions. The only requirement is that a PFE 310 writes an egress instruction to words of a block that has been allocated by its per-PFE allocator 820 (assuming there is no conflict within the given PFE).

§ 5.4 Example Method(s)

Figure 10:
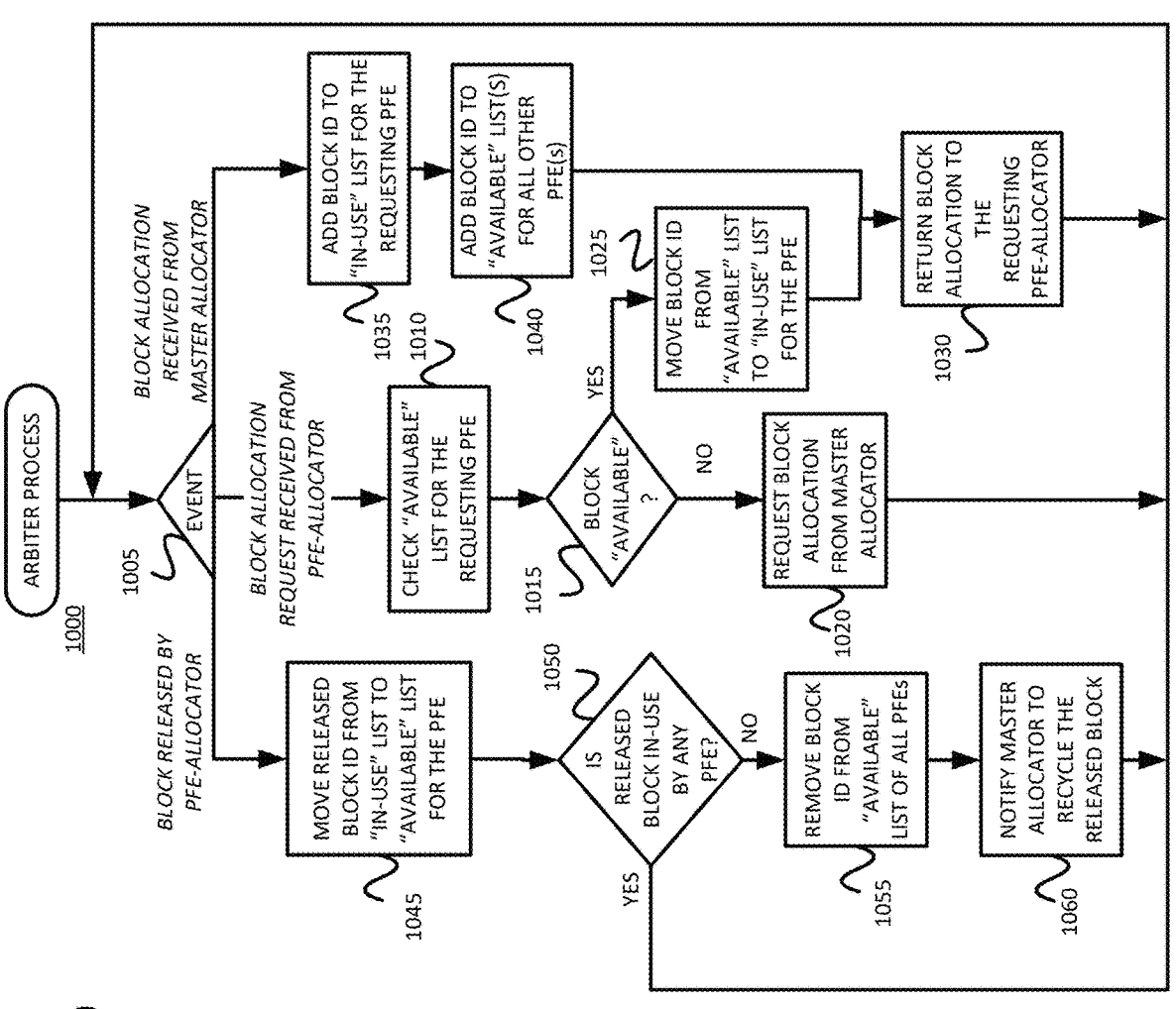
FIG. 10 is a flow diagram of an example arbitrator method consistent with the present description.

FIG. 10 is a flow diagram of an example arbitrator method 1000 consistent with the present description. Different branches of the example method 1000 are performed responsive to the occurrence of different events or conditions 1005. Referring first to the middle branch, responsive to a block allocation request received from a per-PFE allocator, the example method 1000 checks an "available" list for the requesting PFE to determine whether or not there is any "available" block. (1010) If there is no block "available" to the PFE (Decision 1015=NO), the example method 1000 requests a block allocation from the master allocator (1020). The example method 1000 then returns to event branch point 1005. If, on the other hand, there is a block "available" to the PFE (Decision 1015=YES), the example method 1000 moves an indicator or identifier of the block from the "available" list for the PFE to an "in-use" list for the PFE (1025), and returns the block allocation to the requesting per-PFE allocator (1030). The example method 1000 then returns to event branch point 1005.

Referring next to the right branch of FIG. 10, responsive to receiving a block allocation from the master allocator, the example method 1000 adds an indicator or identifier of the block to the "in-use" list for the requesting PFE (1035), adds an indictor or identifier of the block to the "available" list(s) for all other PFE(s) (1040). The example method 1000 then returns the block allocation to the requesting per-PFE allocator (1030), before it returns to event branch point 1005.

Finally, referring to the left branch of FIG. 10, responsive to receiving a communication that a block is released by a per-PFE allocator, the example method 1000 moves an indicator or identifier of the released block from the "in-use" list for the PFE (that released the block) to the "available" list of the PFE (that released the block). (1045) Next, it is determined whether or not the released block is "in-use" by any other PFE. (Decision 1050) Responsive to a determination that the released block is not "in-use" by any other PFE (Decision 1050=NO), the example method 1000 removes the block identifier from the "available" list(s) for all other PFE(s) (1055) and notifies the master allocator that the released block should be recycled (e.g., made "unallocated") (1060), before the example method 1000 returns to event branch point 1005. If, on the other hand, it is determined that the released block is "in-use" by at least one other PFE (Decision 1050=YES), the example method 1000 returns to event branch point 1005.

Figure 11:
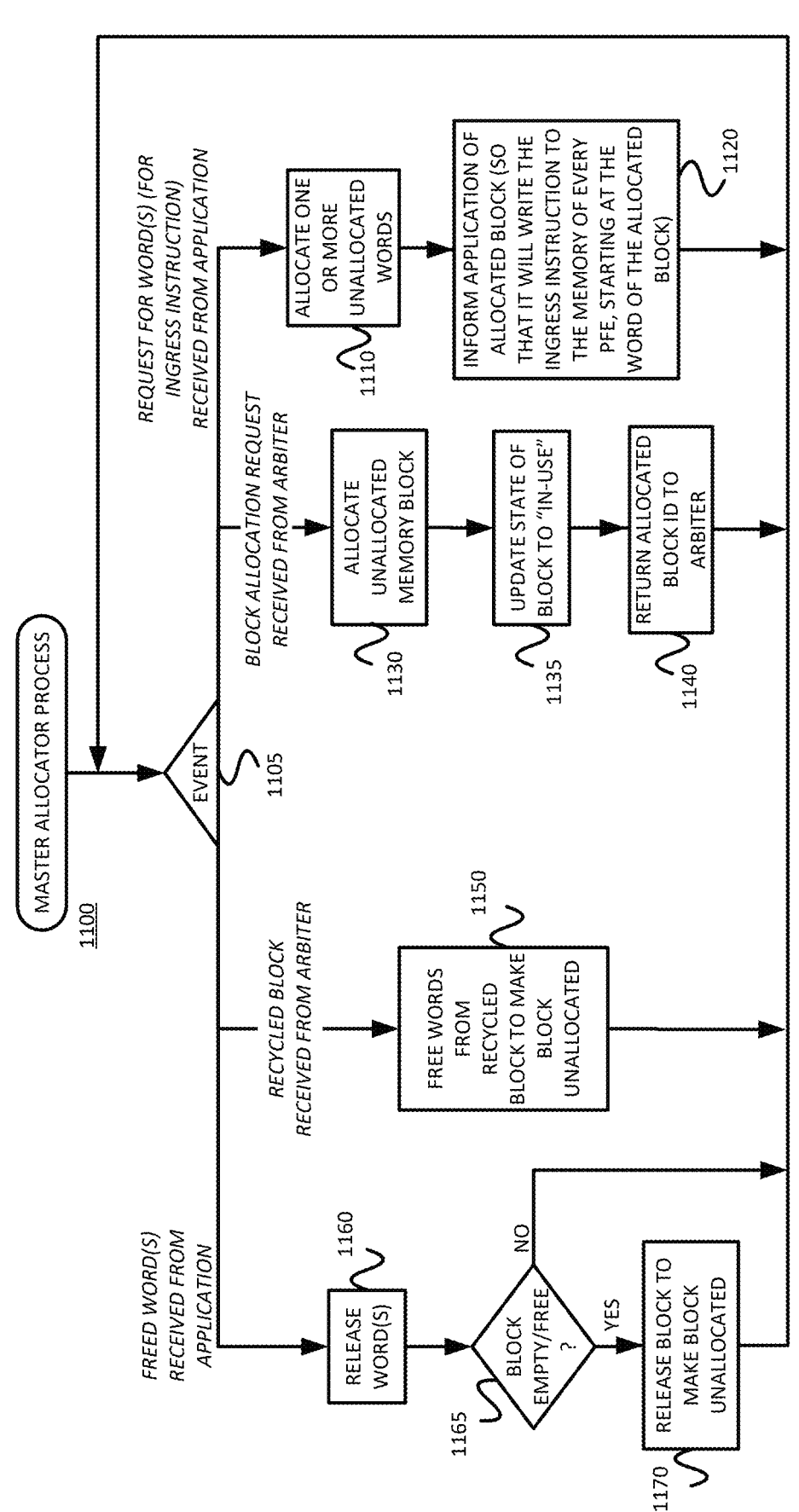
FIG. 11 is a flow diagram of an example master allocator method consistent with the present description.

FIG. 11 is a flow diagram of an example master allocator method 1100 consistent with the present description. Different branches of the example method 1100 are performed in response to the occurrence of different events or conditions 1105. Referring first to the right-most branch of FIG. 11, responsive to a determination that a request for one or more words for an ingress instruction is received from an application, the example method 1100 allocates one or more available word(s) (1110) and informs the application of the allocated word(s) (so that the application will write the ingress instruction to the memory of every PFE starting at the allocated word(s) (1120). The example method 1100 then returns to event branch point 1105.

Referring next to the second-from-right-most branch of FIG. 11, responsive to receiving a block allocation request from the arbiter (Recall, e.g., 1020 of FIG. 10.), the example method 1100 allocates an unallocated memory block (1130) and returns the block allocation (e.g., as a block identifier) to the arbiter (1140) (Recall, e.g., the condition at the right branch of FIG. 10.). The example method then 1100 returns to event branch point 1105.

Referring next to the second-from-left-most branch of FIG. 11, responsive to receiving an indication of a recycled block from the arbiter (Recall, e.g., 1060 of FIG. 10.), the example method 1100 frees word(s) from the recycled block to make the word(s)/block unallocated (or free for reuse) (1150), before the example method 1100 returns to event branch point 1105.

Finally, referring to the left-most branch of FIG. 11, responsive to receiving freed word(s) from the application, the example method 1100 releases the word(s) (1160). The example method 1100 then determines whether or not the block to which the released word(s) belongs is empty (free). (Decision 1165) Responsive to a determination that the block is empty (free) (Decision 1165=YES), the example method 1100 releases the block (to make the block "unallocated") (1170), before the method 1100 returns to event branch point 1105. If, on the other hand, the block is not empty (free) (Decision 1165=NO), the example method 1100 returns to event branch point 1105.

Generally, a master allocator allocates a block (and word (s)) within the allocated block) to a particular ingress instruction. This can be repeated for further ingress instructions. Generally, a master allocator allocates a block for use by one or more egress instructions. This can be repeated as further memory is needed for further egress instructions.

Figure 12:
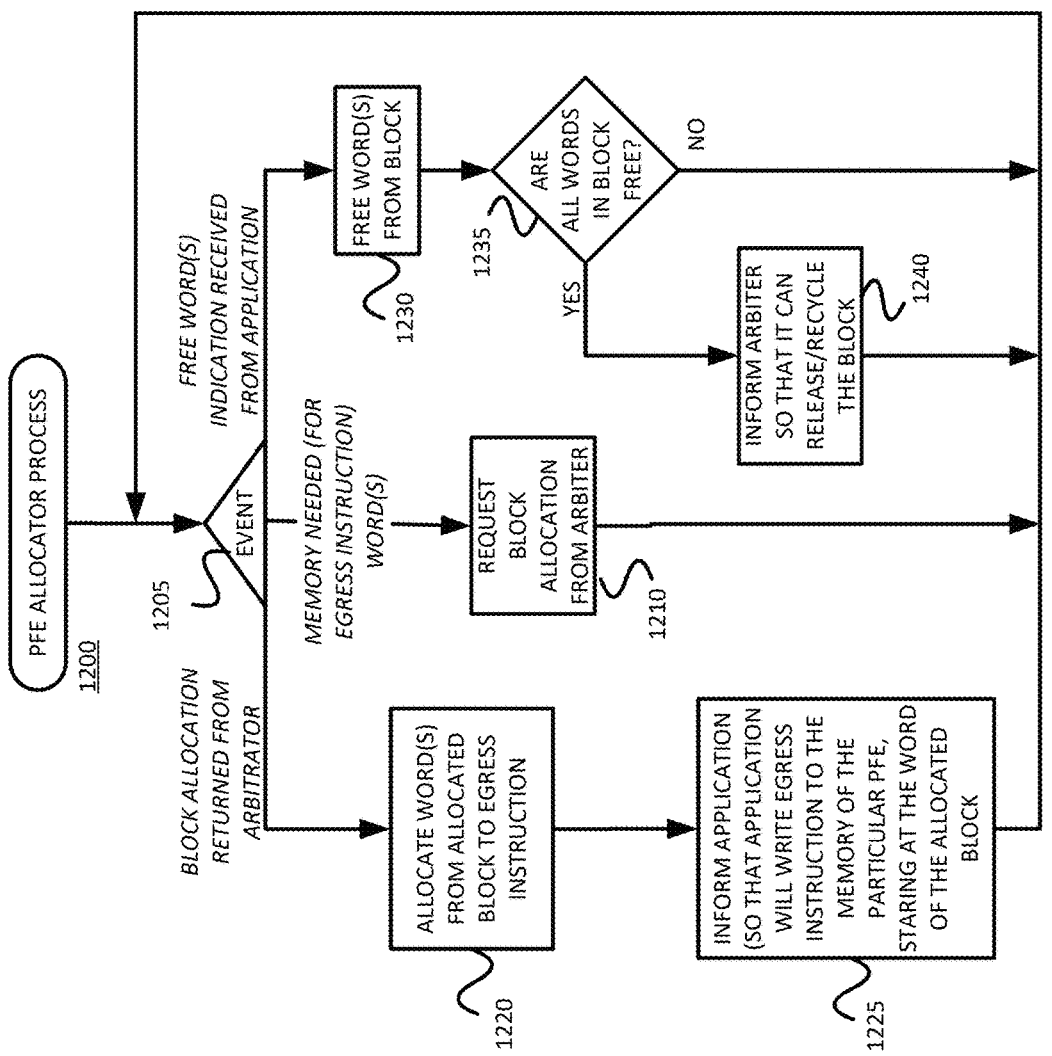
FIG. 12 is a flow diagram of an example PFE allocator method consistent with the present description.

FIG. 12 is a flow diagram of an example PFE allocator method 1200 consistent with the present description. Different branches of the example method 1200 are performed in response to the occurrence of different conditions or events 1205. Referring first to the middle branch of FIG. 12, responsive to the need for memory for word(s) of an egress instruction, the example method 1200 requests a block allocation from the arbiter (1210) (Recall, e.g., the condition of the middle branch of FIG. 10.) before the example method 1200 returns to event branch point 1205.

Referring next to the left branch of FIG. 12, responsive to receiving a block allocation returned from the arbiter (Recall, e.g., 1030 of FIG. 10.), the example method 1200 allocates word(s) from the allocated block to the egress instruction (1220) and informs the application that prompted a request of the allocated word(s) and block (so that the application will write the egress instruction of the memory of the particular PFE starting at the word of the allocated block) (1225). The example method 1200 then returns to event branch point 1205.

Finally, referring to the right branch of FIG. 12, responsive to receiving an indication of free word(s) from the application, the example method 1200 frees the indicated word(s) from the block. (1230) If all words in the block are free (Decision 1235=YES), the arbiter is informed (1240) (Recall, e.g., the condition of the left branch of FIG. 10.), before the example method 1200 returns to event branch point 1205. If, on the other hand, all words in the block are not free (Decision 1235=NO), the example method 1200 returns to event branch point 1205.

Generally, a per-PFE allocator doesn't allocate blocks directly, but rather allocates word(s) at different address(es) within an available block (that was requested from the master allocator via the arbiter).

Figure 13:
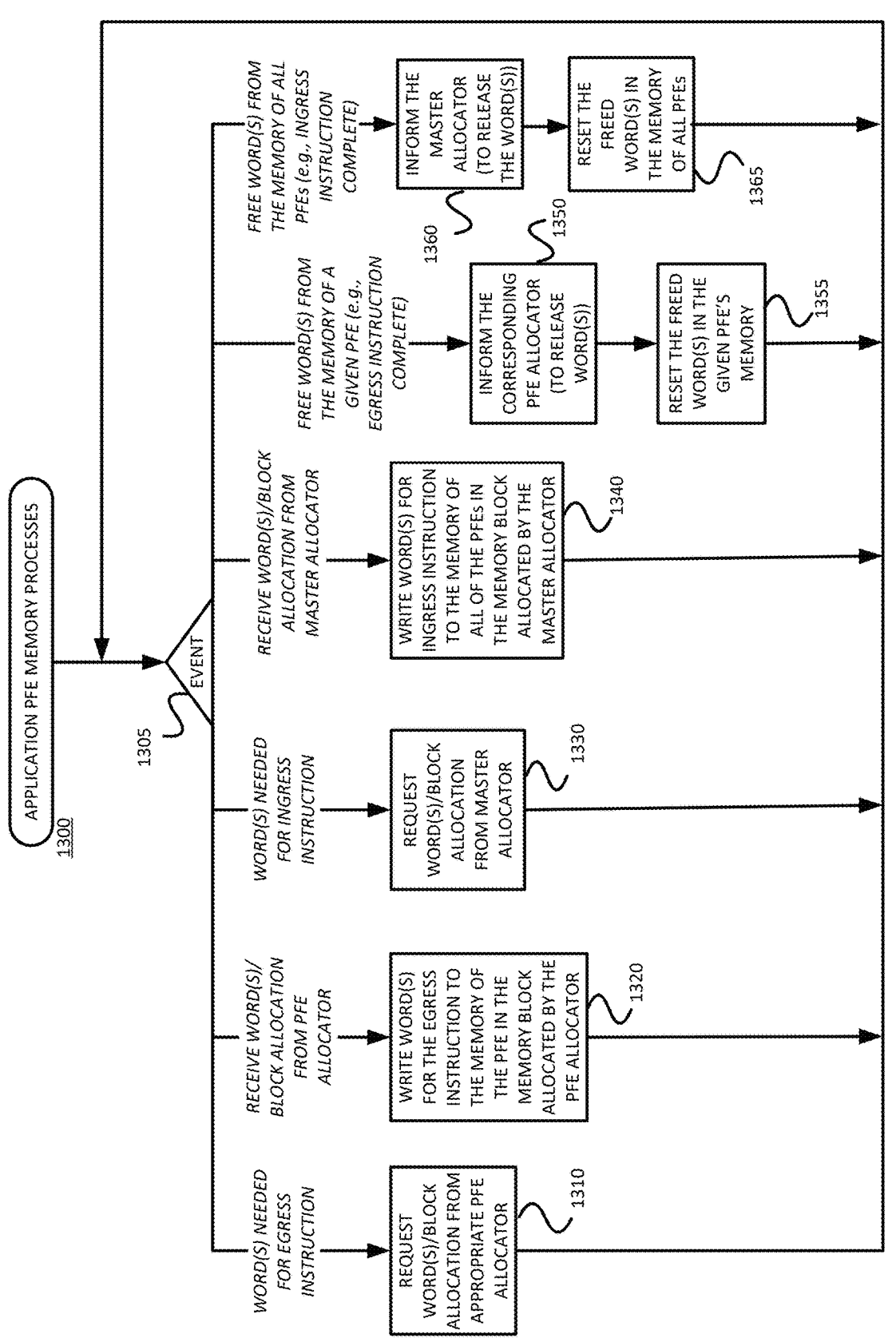
FIG. 13 is a flow diagram of an example application method (using PFE memory) consistent with the present description.

FIG. 13 is a flow diagram of an example application method 1300 (using PFE memory) consistent with the present description. Different branches of the example method 1300 are performed in response to the occurrence of different conditions or events 1305. Referring first to the left-most branch of FIG. 11, responsive to the need for word(s) for an egress instruction, the example method 1300 requests a block allocation from the appropriate per-PFE allocator (1320) (Recall, e.g., the condition of the middle branch of FIG. 12.), before the example method 1300 returns to event branch point 1305.

Referring next to the second-from-left branch of FIG. 13, responsive to receiving an allocation of a block from a per-PFE allocator (Recall, e.g., 1225 of FIG. 12.), the example method 1300 writes word(s) for the egress instruction to the memory of the PFE in the memory block allocated by the per-PFE allocator (1320), before the example method 1300 returns to event branch point 1305.

Referring next to the third-from-left branch of FIG. 13, responsive to needing word(s) for an ingress instruction, the example method 1300 requests the word(s)/block allocation from the master allocator (1330) (Recall, e.g., the condition of the right-most branch of FIG. 11.), before the example method 1300 returns to event branch point 1305.

Referring to the third-from-right branch of FIG. 13, responsive to receiving a word(s)/block allocation from the master allocator (Recall, e.g., 1120 of FIG. 11.), the example method 1300 writes the word(s) for the ingress instruction to the memory of all of the PFEs, in the memory block allocated by the master allocator (1340), before the example method 1300 returns to event branch point 1305.

Referring next to the second-from-right branch of FIG. 13, responsive to the ability to free word(s) from the memory of a given PFE (e.g., due to the completion of an egress instruction), the example method 1300 informs the corresponding per-PFE allocator (1350) (Recall, e.g., the condition of the right branch of FIG. 12.), and resets the freed word(s) in the memory of the given PFE (1355). The example method 1300 then returns to event branch point 1305.

Finally, referring to the right-most branch of FIG. 13, responsive to free word(s) from the memory of all PFEs (e.g., due to the completion of an ingress instruction), the example method 1300 informs the master allocator (to release the word(s)) (1360) (Recall, e.g., the condition of the left-most branch of FIG. 11.), and resets the freed word(s) in the memory of all PFEs (1365). The example method 1300 then returns to event branch point 1305.

Referring back to 1355 and 1365 of FIG. 13, an application may, though need not, reset freed words.

Generally, the master allocator and the per-PFE allocators function to allocate memory (e.g., as needed) and free memory (e.g., that is no longer needed).

§ 5.5 Example Apparatus

An example memory management system for use in a system having a plurality of packet forwarding engines (PFEs) is described. In the example system, each PFE has a memory (e.g., an application specific integrated circuit (ASIC) memory), each of the memories is divided into a plurality of blocks, and each of the blocks has a plurality of words. The example memory management system includes (a) a master allocator (e.g., configured to perform the process 1100 of FIG. 11), (b) a per-PFE allocator associated with each of the PFEs (e.g., each configured to perform the process 1200 of FIG. 12), (c) an arbiter (e.g., configured to perform the process 1000 of FIG. 10), and (d) an application (e.g., configured to perform the process 1300 of FIG. 13).

Each of the components of the example memory management system may be implemented as software, executed by one or more CPUs. (Recall, e.g., FIGS. 4-7.) The CPU may execute machine-executable instructions stored on a non-transitory storage medium. Examples illustrating operations of each of these components are described in § 4.6 below with reference to FIGS. 14-20.

§ 5.6 Examples of Operations of Example Method(s)

Figure 14:
FIG. 14 illustrates operations of an example arbiter.

FIG. 14 is a line drawing illustrating operations of an example arbiter. An "allocated" (e.g., reserved) block is depicted by heavy dashed lines. Allocators 810, 820a, 820b use an arbiter 1490 to enforce exclusion. Per-PFE allocators 820a and 820b request and release blocks through the arbiter 1490. The arbiter 1490 serves as an intermediary between the master allocator 810 and the per-PFE allocators 820a and 820b. Generally, the arbiter 1490 tracks the blocks currently "in use" by each PFE 310. (Note that the arbiter 1490 does not directly track blocks used for ingress instructions.) For example, the arbiter 1490 maintains, for each PFE 310, state data 1495 including (1) an "in use" list 1497 that stores indicators or identifiers of blocks currently in active use by the given PFE, and (2) an "available" list 1499 that stores indicators or identifiers of blocks that are available to the PFE (that is, blocks that are allocated to the PFE), but not currently in active use by the PFE.

In this example, the per-PFE allocator 0 820a requests a block from the arbiter 1490. (Arrow 1410) Assume that, initially, no block is allocated (available). In response to the request, the arbiter 1490 requests a block from the master allocator 810. (Arrow 1420) The master allocator 810 allocates block 0 for the arbiter 1490 (Arrow 1430) and returns an allocation of block 0 back to the arbiter 1490 (Arrow 1440). In response, the arbiter 1490 adds an indicator or identifier of block 0 to the "in-use" list 1497a of PFE 0 (Arrow 1450), and adds an indicator or identifier of block 0 to "available" list 1499b of PFE 1 (and any other PFEs) (Arrow 1460). Finally, the arbiter 1490 returns the allocation of block 0 to the per-PFE allocator 0 820a. (Arrow 1470)

Figure 15:
FIG. 15 illustrates storing an egress instruction.

FIG. 15 is a line drawing illustrating storing an egress instruction for PFE 0. Assume that the state of the system is an initial state, in which all of the blocks are "unallocated." An "allocated" (e.g., reserved) block is depicted by heavy dashed lines. An egress instruction is depicted by heavy bold lines. Assume that the application 1505 requests words from per-PFE allocator 820a for PFE 0 310a. (Arrow 1510) In response, the per-PFE allocator 820a for PFE 0 310a requests a block from arbiter 1490. (Arrow 1520) Since there are no blocks allocated (that is, no blocks "available" or "in-use"), the arbiter 1490 requests a block from the master allocator 810. (Arrow 1530) In response, the master allocator 810 allocates block 0 for arbiter 1490 (Arrow 1540) and returns an indicator or identifier of block 0 back to the arbiter 1490 (Arrow 1550). In response, the arbiter 1490 adds an indicator or identifier of block 0 to the "in-use" list 1497a of PFE 0 310a (Arrow 1560), and adds an indicator or identifier of block 0 to the "available" list 1499b of all other PFEs (PFE 1 310b in this example) (Arrow 1570). The arbiter 1490 then returns the allocation of block 0 to the per-PFE allocator 820a for PFE 0 310a. (Arrow 1580) In response, the per-PFE allocator 820a for PFE 0 310a allocates words 0 and 1 (assuming two words are needed for the egress instruction) in block 0 and returns words 0 and 1 of block 0 to the application 1505. (Arrow 1590) Finally, the application 1505 writes the words for the egress instruction to words 0 and 1 of block 0 of the PFE 0 memory 610a in hardware. (Arrow 1595) Note that instead of returning multiple words to the application, the starting address of the words and the number of words may be returned in an alternative implementation.

Figure 16:
FIG. 16 illustrates storing another egress instruction.

FIG. 16 is a line drawing illustrating storing another egress instruction. As was the case above, an "allocated" (e.g., reserved) block is depicted by heavy dashed lines, and an egress instruction is depicted by heavy bold lines. Assume that the state of the system is the state at the end of the operations of FIG. 15. Assume that the application 1505 requests a word (for an egress instruction) from the per-PFE allocator 820b for PFE 1 310b. (Arrow 1610) In response, the per-PFE allocator 820b for PFE 1 310b requests a block allocation from the arbiter 1490. (Arrow 1620) Since the arbiter 1490 has block 0 available in the "available" list 1499b for PFE 1 310b (Arrow 1630), the arbiter 1490 moves an indicator or identifier of block 0 from the "available" list (not shown) 1499b to the "in-use" list 1497b for PFE 1 310b. The arbiter 1490 then returns the allocation of block 0 to the per-PFE allocator 820b for PFE 1 310b. (Arrow 1640) The per-PFE allocator 820b for PFE 1 310b allocates one word from Block 0 (assume that the egress instruction only requires one word) and returns the word (word 0 of block 0) to the application 1505. (Arrow 1650) Finally, the application 1505 writes the word to word 0 of block 1 in the memory 610*b* for PFE 1 310*b* in hardware. (Arrow 1660)

Figure 17:
FIG. 17 illustrates storing an ingress instruction.

FIG. 17 is a line drawing illustrating storing an ingress instruction. As was the case above, an "allocated" (e.g., reserved) block is depicted by heavy dashed lines, and an egress instruction is depicted by heavy bold lines. Further, an ingress instruction is depicted by triple lines. As shown, the application 1505 requests an allocation for words (assume that two words are needed for the ingress instruction) from master allocator 810. (Arrow 1710) In response, the master allocator 810 allocates two (2) words (words 3 and 4 of block 1) and returns the word allocation to the application 1505. (Arrow 1720) Note that since the master allocator 810 has allocated words from block 1, it will not allocate any part of block 1 to egress instructions (e.g., due to requests from a per-PFE allocator, via the arbiter), unless and until the block is later freed. This ensures "mutual exclusion," as discussed above with respect to FIG. 9. In response, the application 1505 writes words for the ingress instruction to words 3 and 4 of block 1 to the memory 610*a* and 610*b* of each and every one of the PFEs (e.g., PFE 0 310*a* and PFE 1 310*b*) in hardware. (Arrows 1730 and 1740)

FIGS. 15-17 illustrated allocating PFE memory 610 locations for different egress instructions, and an ingress instruction. Next, freeing words and/or blocks when the in-use memory location is no longer needed is described with reference to FIGS. 18-20. When words are freed, their corresponding block(s) 620 might (but do not necessarily) become free. When a block 620 for storing an ingress instruction becomes free, the master allocator 810 will make it "unallocated". When a block 620 for storing an egress instruction becomes free (e.g., when no PFE memory 610 has any words that need to be stored in the block), the arbiter 1490 removes an indicator or identifier of the block from the "in-use" list 1497 and/or "available" list 1499 and the arbiter 1490 informs the master allocator 810. The master allocator 810 then makes the block "unallocated." Unallocated blocks and/or words may then be reused.

Figure 18:
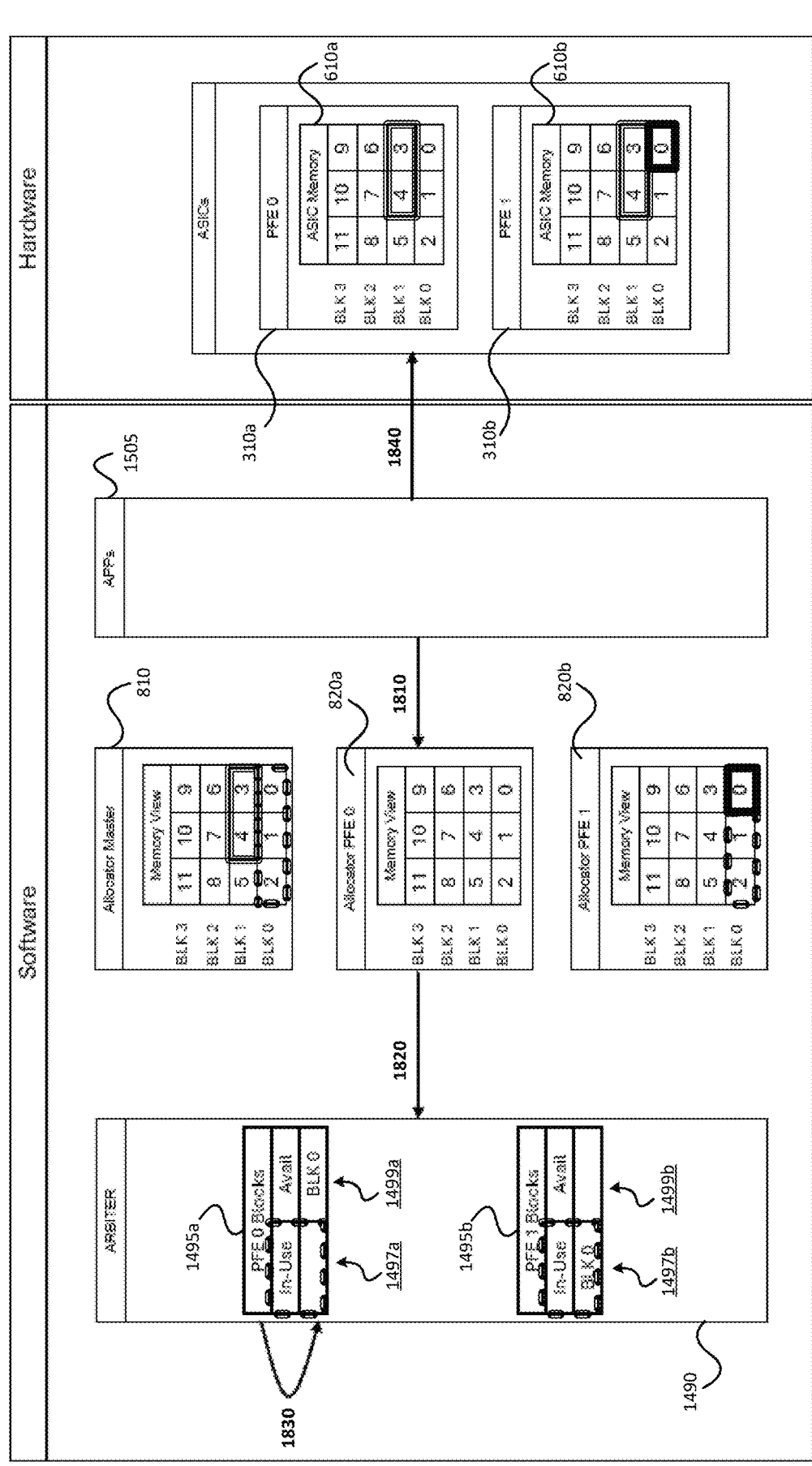
FIG. 18 illustrates freeing a memory block/words storing an egress instruction.

FIG. 18 is a line drawing illustrating freeing a memory block/words storing an egress instruction. As was the case above, an "allocated" (e.g., reserved) block is depicted by heavy dashed lines, an egress instruction is depicted by heavy bold lines, and an ingress instruction is depicted by triple lines. First, the application 1505 frees two (2) words starting at address 0 from PFE 0 310*a* and informs the per-PFE allocator 820*a* for PFE 0 310*a*. (Arrow 1810) In response, the per-PFE allocator 820*a* for PFE 0 310*a* frees two words starting at address 0. (Compare FIGS. 17 and 18.) Since all words of block 0 in the memory 610*a* of PFE 0 310*a* are free, the per-PFE allocator 0 820*a* releases block 0 and informs the arbiter 1490. (Arrow 1820) In response, the arbiter 1490 moves an indicator or identifier of block 0 from the "in-use" list 1497*a* for PFE 0 to the "available" list 1499*a* for PFE 0. (Arrow 1830) Further, the application 1505 resets freed words in hardware starting at address 0 of the memory 610*a* in PFE 0 310*a*. (Compare FIGS. 17 and 18.)

Figure 19:
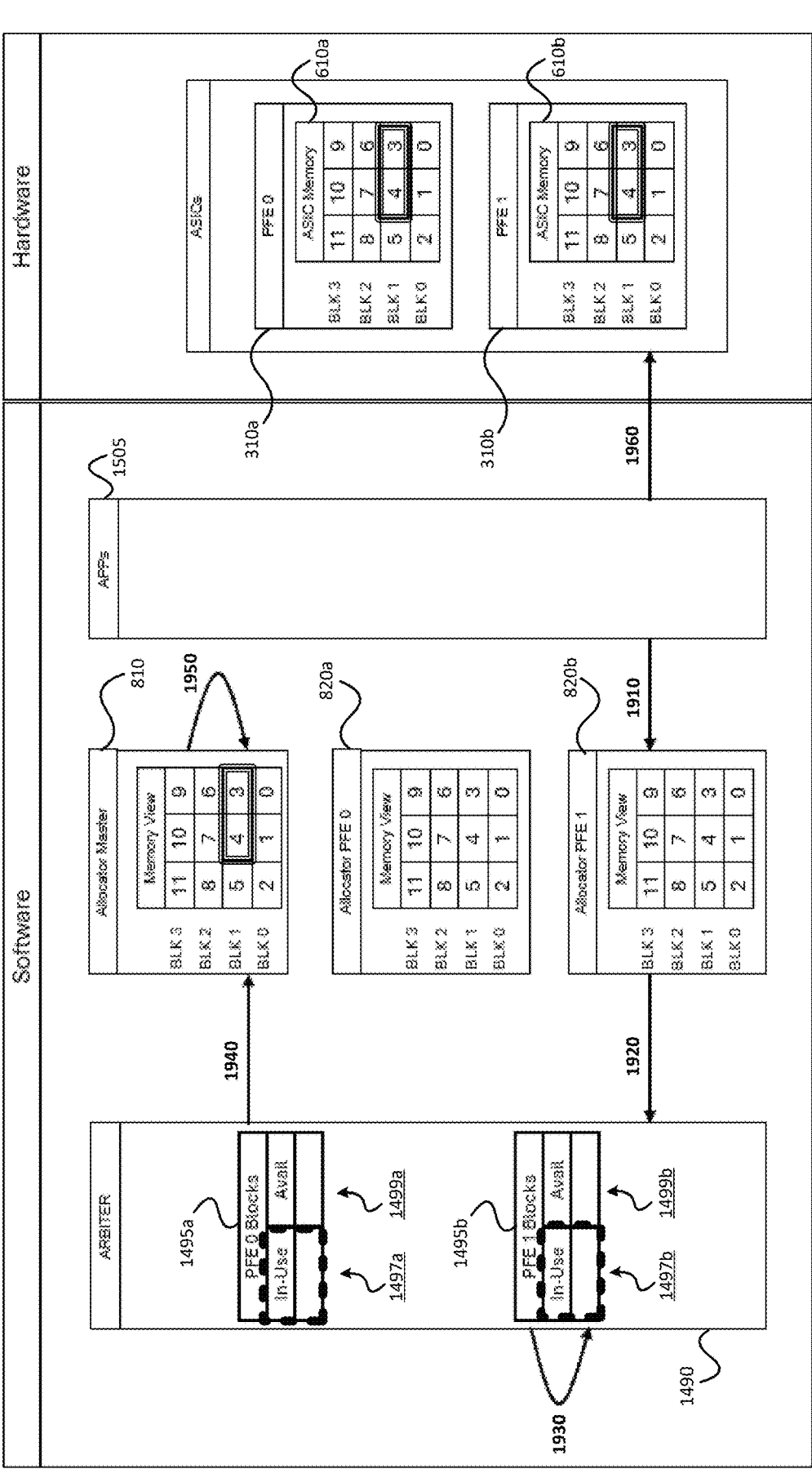
FIG. 19 illustrates freeing a memory block/words storing another egress instruction.

FIG. 19 is a line drawing illustrating freeing a memory block/words storing another egress instruction. As was the case above, an "allocated" (e.g., reserved) block is depicted by heavy dashed lines, an egress instruction is depicted by heavy bold lines, and an ingress instruction is depicted by triple lines. First, the application 1505 frees one (1) word at address 0 from the memory 610*b* of PFE 1 310*b* and informs the per-PFE allocator 820*b* for PFE 1 310*b*. (Arrow 1910) In response, the per-PFE allocator 820*b* for PFE 1 310*b* frees one (1) word at address 0 of block 0. Since all words of block

0 are free, the per-PFE allocator 820*b* for PFE 1 310 releases block 0 and informs the arbiter 1490. (Arrow 1920) (Compare FIGS. 18 and 19.) In response, the arbiter 1490 removes an indicator or identifier of block 0 from in-use list 1497*b* for PFE 1 310*b* (and optionally adds it to the "available" list 1499*b* for PFE 1 310*b*). (Arrow 1930) Since all PFEs (PFE 0 310*a* and PFE 1 310*b* in this example) have released block 0, arbiter 1490 recycles block 0 and informs the master allocator 810. (Arrow 1940) In response, the master allocator 810 frees up block 0 back to the "unallocated" (that is, free) pool. (Arrow 1950) The application 1505 also resets freed word (word 0 at block 0) in hardware at address 0 in the memory 610*b* of PFE 1 310*b*. (Compare FIGS. 18 and 19.)

Figure 20:
FIG. 20 illustrates freeing a memory block/words storing an ingress instruction.

FIG. 20 is a line drawing illustrating freeing a memory block/words storing an ingress instruction. As was the case above, an ingress instruction is depicted by triple lines. Assume that the application 1505 frees two (2) words corresponding to the ingress instruction (e.g., words 3 and 4 of block 1), and informs the master allocator 810. (Arrow 2010) In response, the master allocator 810 frees two (2) words starting at address 3 (i.e., words 3 and 4 of block 1). (Arrow 2020) The application 1505 also resets freed words in hardware at starting address 3 in block 1 in the memories 610*a* and 610*b* of both PFE 0 310*a* and PFE 1 310*b*, respectively. (Arrows 2030 and 2040)

§ 5.7 Refinements, Alternatives, and/or Extensions

§ 5.7.1 Alternative Data Structures

Although the arbiter was described as maintaining lists for "in-use" and "available" blocks for each PFE, other data structures may be used instead.

§ 5.7.2 Alternative PER-PFE Allocators

Although per-PFE allocators were described, per-PFE group allocators may be used, in which a per-PFE group allocator is associated with a group of at least two PFEs. This may be used in situations in which it is useful to have distinct groups of PFEs, such as in the case of instructions applied to packets in an Ethernet link aggregation group (LAG) for example.

§ 5.7.3 Fusing or Coalescing Free Words

Network elements such as routers and switches might have dedicated fixed size memories for storing forwarding-instructions. Forwarding-instructions typically take the form of routes and nexthops. It might be desired to have the memory allocated for forwarding-instructions to attempt to pack the instructions more densely (e.g., as densely as possible) to achieve better (e.g., maximum) scale. The number of forwarding-instructions that can be stored in the memory space directly translates to the scale that can be supported by the network element. Traditional memory allocation policies rely on maintaining lists of free blocks or pages of fixed size blocks. Fragmentation resulting from such allocation policies leads to reduced scale for the forwarding instructions.

This section presents a novel approach for managing memory allocations of arbitrary sizes while reducing (e.g., minimizing) fragmentation. One key to dense allocations is to have the largest possible free blocks. A fusing approach to achieving large free blocks is described. The fusing approach does not need to maintain memory pools or free-lists of buffers.

As noted above, reducing fragmentation helps achieve the best packing density for the forwarding instructions in the memory space. Fragmentation with traditional allocators is largely determined by the allocation profile. If all allocation requests were of the same size, one can virtually eliminate fragmentation because any memory hole left between two allocated chunks of memory could be reused for a subsequent allocation request (since the allocation size would match the memory hole size) FIGS. 21A-21C show fixed size allocation. When there is a memory hole after a block is freed (FIG. 21B), a new allocation request will fit perfectly in the vacant memory (FIG. 21C).

However, this advantage does not exist if the allocation profile changes, and the allocation requests are for differently sized blocks of memory. FIGS. 22A-22C illustrate variable size allocation. As shown in FIGS. 22B and 22C, memory holes between two allocated chunks of memory might not be able to accommodate a subsequent allocation request. Such unused memory holes increase fragmentation and ultimately lead to reduced scale.

Fragmentation can be reduced if adjacent free blocks can be coalesced (or "fused") into larger blocks. FIGS. 23A-23C show coalesced adjacent blocks. The ability to coalesce adjacent free blocks of arbitrary sizes into larger blocks increases the odds of reducing fragmentation. This is because, as illustrated in FIGS. 23B and 23C, larger available block(s) can accommodate newer allocation requests with a higher probability, compared to smaller available blocks.

An example fusing technique using a size-indexed dictionary and a fusing bit-string is described. Adjacent free blocks of arbitrary sizes are coalesced into larger free blocks, reducing (e.g., minimizing) fragmentation and improving the utilization of the memory address space. Memory pools or free-lists of buffers are not required.

Three (3) data structures are used to manage a given address space of N words—(1) a Size-Indexed Dictionary, (2) a Fusing Bit-String, and (3) an Address Dictionary. Each of these three data structures are described.

First, a size-indexed dictionary is used to track currently available sizes in the memory space. This dictionary is used to query the availability of a requested block-size for allocation in the address space. The lookup key to the dictionary is the requested size in words, and the value is the (starting) address location at which the size is available. The size-indexed dictionary initially starts out with a single entry. After a series of allocations and frees, memory availability spreads across multiple entries. FIGS. 24A and 24B show an example size-indexed dictionary. The size-indexed dictionary may have duplicate keys because a given size can be available at multiple address locations. Initially, the entire memory space (size=N) is available for allocation at address 0, as shown in FIG. 24A. After a series of allocations and frees, memory size availability spreads across multiple entries, as illustrated in FIG. 24B.

Second, a fusing bit-string is a string of bits used to aid the fusing or coalescing of adjacent free blocks. There are as many bits in the string as there are words in the total memory space. Each word has its own unique bit in the fusing bit-string. More specifically, bits corresponding to allocated words are turned ON (e.g., set to "1"), and bits corresponding to free (d) addresses are turned OFF (e.g., set to "0"). When an address block is freed, a forward scan and a backward scan are performed from the freed address. These scans inform the presence or absence of adjacent free blocks before and/or after, respectively, the freed address. FIG. 25 shows an example fusing bit-string. This information is used to update the size-indexed dictionary with a single fused address block instead of separate individual free blocks.

Third, an address-indexed dictionary tracks the currently allocated addresses and the associated sizes. This dictionary provides a quick means of checking whether a given address has been allocated during free operations.

In one example implementation, freed memory is coalesced (fused) to reduce fragmentation and produce the largest available blocks for allocation. Larger available blocks have a better chance of accommodating newer allocation requests. FIG. 26 shows a Fused Segment consisting of freed, adjacent blocks 1, 2 and 3.

The size-indexed dictionary data structure tracks the block-sizes currently available for allocation in the memory space. An allocation request triggers a lookup in the size-indexed dictionary. If a size entry greater than or equal to the requested size is found, the requested size is subtracted from the size entry. If exact match is found, size entry is deleted from the dictionary. The address corresponding to the size is returned to the user. After an allocation, the sizes available for allocation in the dictionary are reduced by the allocated size.

Figure 27:
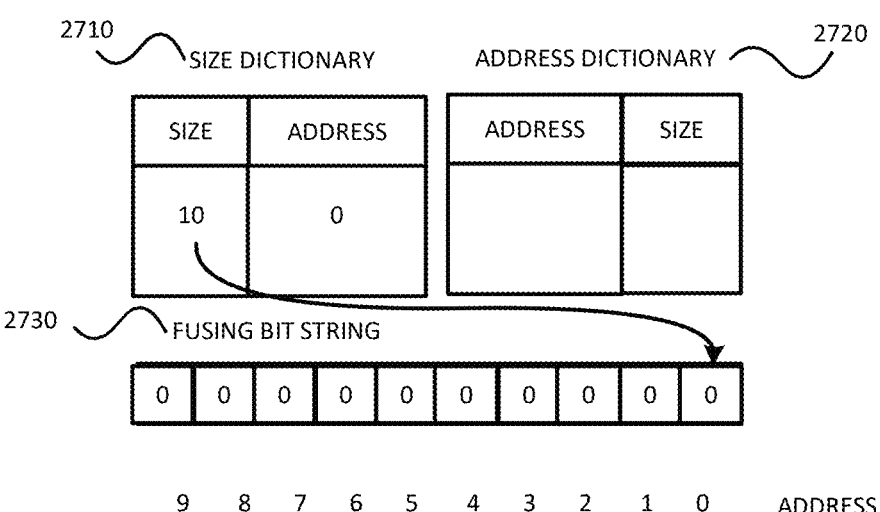
FIG. 27 illustrates the availability of the entire address space at initiation.

An example of contents of the size-indexed dictionary data structure during certain operations is now described. The size-indexed dictionary starts out with a single entry after system initialization. At this time, the entire memory space is available for allocation at address 0. Assume in a simple example that the entire address space is ten words. FIG. 27 shows that the entire address space is available at initialization. This is indicated by the information in the size-indexed dictionary 2710. No words are stored, as indicated by the information in the address dictionary 2720 and by the fusing bit string 2730.

Figure 28:
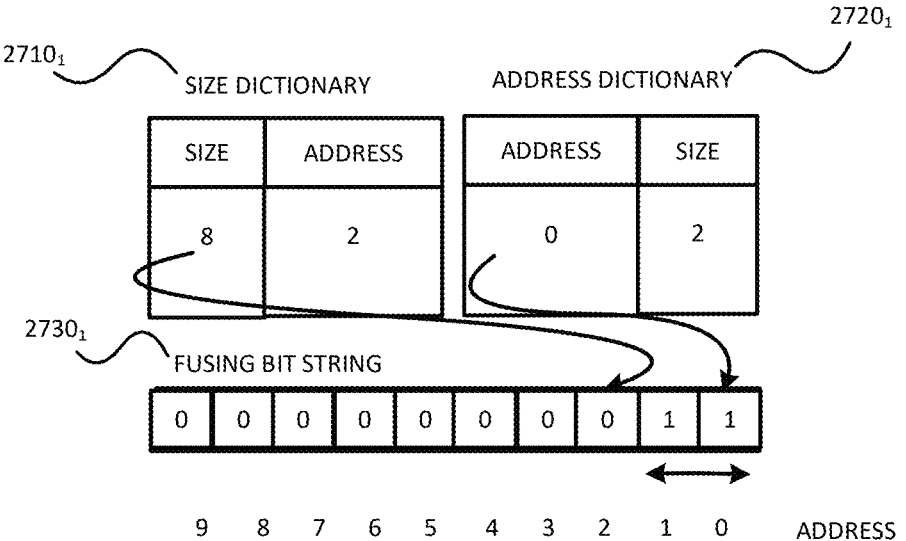
FIG. 28 illustrates size dictionary, address dictionary, and fusing bit-string data structures used in a two-word allocation.

Next, assume that there is an allocation request for two (2) words. This will reduce the available size in the size-indexed dictionary by two (2). (Compare the size field of the size-indexed dictionary 2710 and $2710_1$ at FIGS. 27 and 28, respectively.) Bits corresponding to the allocated words are turned ON in the fusing bit-string $2730_1$. The allocated address (0) is added to address dictionary $2720_1$. There is now free memory for eight (8) words, starting at address 2, as indicated by size-indexed dictionary $2710_1$. FIG. 28 shows a 2-word Allocation.

Figure 29:
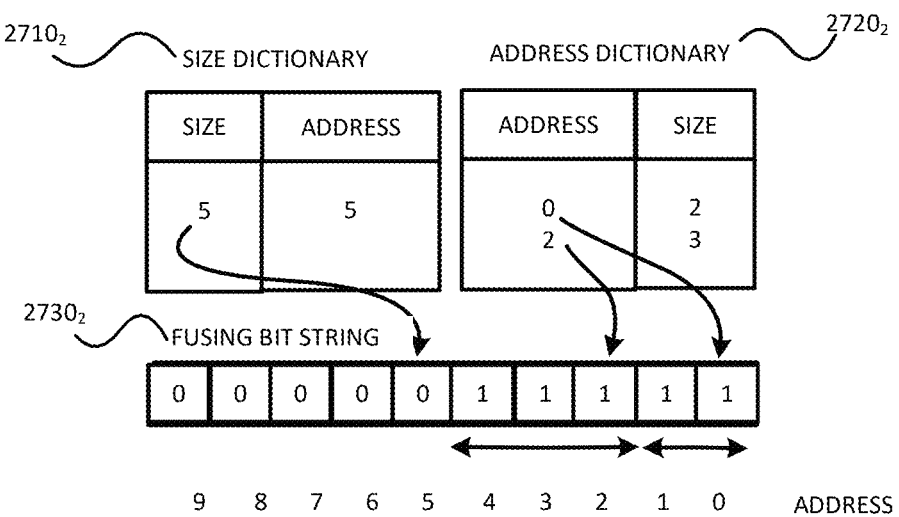
FIG. 29 illustrates size dictionary, address dictionary, and fusing bit-string data structures used in a three-word allocation.
Figure 30:
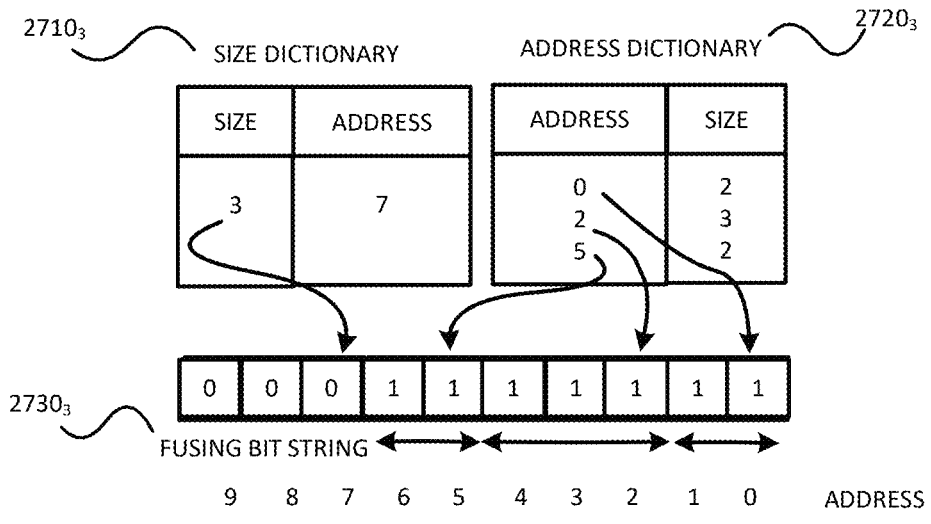
FIG. 30 illustrates size dictionary, address dictionary, and fusing bit-string data structures used in another two-word allocation.
Figures 31, 32:
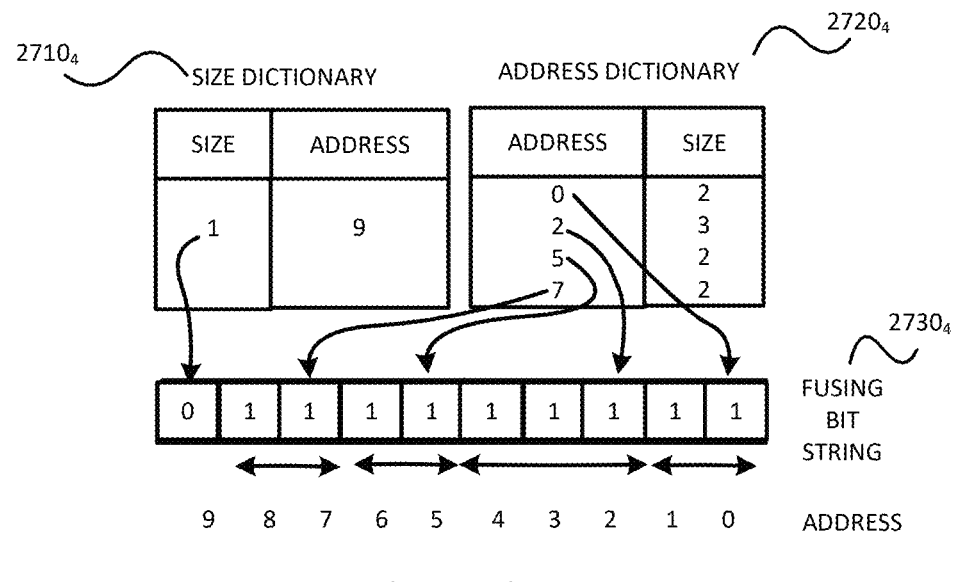
FIG. 31 illustrates size dictionary, address dictionary, and fusing bit-string data structures used in a two-word allocation.
FIG. 32 illustrates fusing bit-string scan operations.

Subsequent allocations track the reduced available size(s) and the newly allocated addresses. Referring to FIG. 29, consider a 3-word Allocation. As shown in address dictionary $2720_2$ and in the fusing bit string $2730_2$, the 3-word allocation begins at address 2. There is now free memory for five (5) words, starting at address 5, as indicated by size-indexed dictionary $2710_2$. Two additional allocations of size 2-words are shown in FIG. 30 and FIG. 31. More specifically, in FIG. 30, a further 2-word allocation begins at address 5, as shown by address dictionary $2720_3$ and fusing bit string $2730_3$. After this allocation, there is free memory for three (3) words, starting at address 7, as indicated by size dictionary $2710_3$. Next, in FIG. 31, a further 2-word allocation beings at address 7, as shown by address dictionary $2720_4$ and fusing bit string $2730_4$. After this allocation, there is free memory for one (1) word, starting at address 9, as indicated by size-indexed dictionary $2710_4$.

The address dictionary 2720 tracks the currently allocated addresses and their associated sizes. A free request triggers a lookup in the address dictionary 2720. If a match is found, the entry is removed from the address dictionary 2720. The free operation also triggers a forward-scan and a backward-scan from the freed location in the fusing bit-string 2730, to detect any adjacent free blocks that can be fused together to produce a larger free block. For example, assume that the 3-word allocation at address 2 is freed. FIG. 32 shows forward and backward scans, starting at address 2, after this free.

Figure 33:
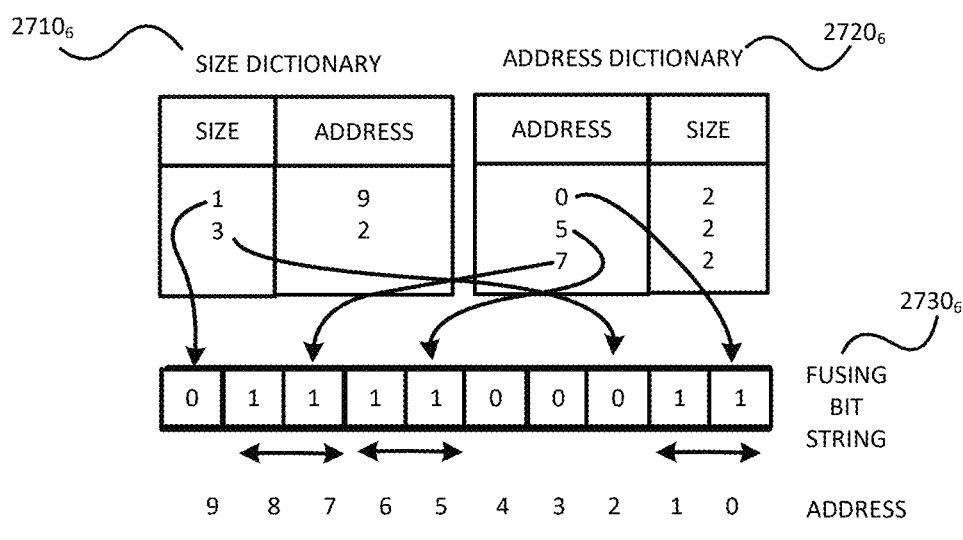
FIG. 33 illustrates size dictionary, address dictionary, and fusing bit-string data structures used when freeing a three-word block.
Figure 34:
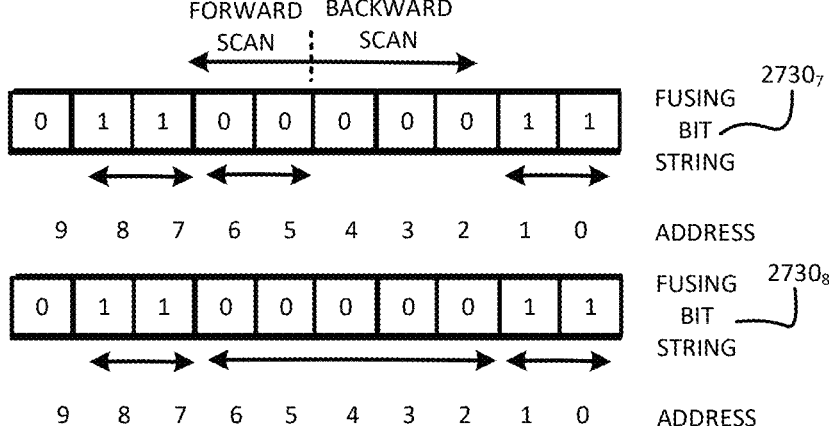
FIG. 34 illustrates fusing bit-string data structures in a fusing (coalescing) operation.
Figure 35:
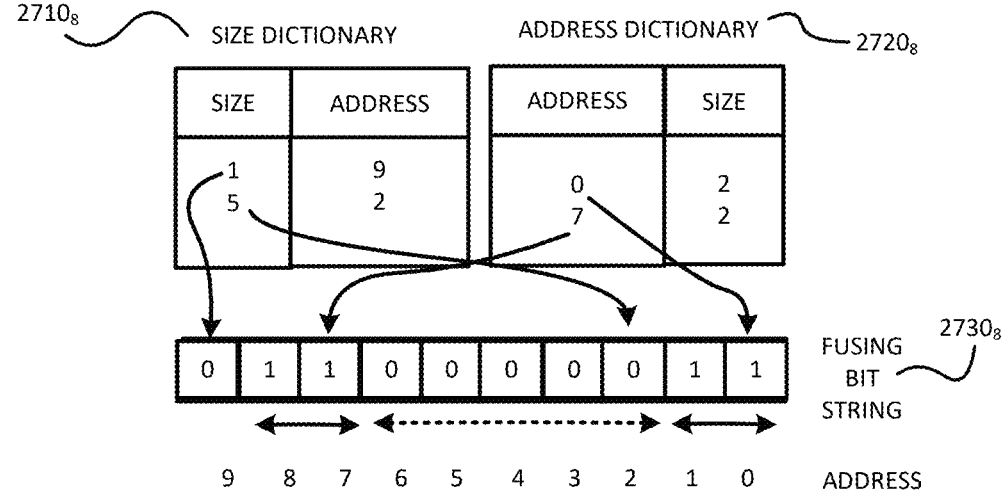
FIG. 35 illustrates size dictionary, address dictionary, and fusing bit-string data structures used in freeing a two-word adjacent block.

Continuing the hypothetical allocation example from the previous section, consider performing two frees to trigger a fusing operation producing a larger available block. The first free operation frees three (3) words at address location 2. FIG. 33 shows freeing the 3-word Block starting at address 2. Another, subsequent, free of two (2) words starting at address 5 triggers a fusing operation for the adjacent free blocks. This fusing operation is illustrated in fusing bit string 2730$_7$ and 2730$_8$ in FIG. 34. As shown in FIG. 35, the size-indexed dictionary 2710$_8$ is updated with the single larger fused block size (five (5) words, which corresponds to the fused, freed, 2-word and 3-word allocations) starting at address 2.

Three algorithms are presented—(1) Allocation, (2) Freeing, and (3) Fusing. The fusing algorithm is triggered by a free operation.

```
ALGORITHM 1: Allocation (Input parameter: requested_size)

iterator = SIZE_DICT.find (key >= requested_size)
IF iterator is valid
    available_size = iterator.first
    allocated_address = iterator.second
    // Remove allocated_size from SIZE_DICT
    SIZE_DICT.erase(iterator)
    // Add allocated_address to ADDR_DICT
    ADDR_DICT.insert (allocated_address, requested_size)
    IF (available_size > requested_size)
        // Add back any remaining unused size to SIZE_DICT
        add_back_size = available size – requessted_size
        add_back_address = allocated_address + requessted_size
        SIZE_DICT.insert (add_back_size, add_back_address)
    ENDIF
    // Set bits in Fusing Bit-String
    set_bits (allocated_address, requested_size)
    RETURN allocated_address
ENDIF
RETURN INVALID_ADDRESS
```

```
ALGORITHM 2: Freeing (Input parameter: entry_address)

iterator = ADDR_DICT.find (entry_address)
IF iterator is valid
    entry_size = iterator.second
    // Remove address from ADDR_DICT
    ADDR_DICT.erase(iterator)
    // Perform backward and forward scans and fuse blocks
    (addr_bwd, size_bwd) = fuse_bwd (entry_address, entry_size)
    (addr_fwd, size_fwd) = fuse_fwd (addr_bwd, size_bwd)
    // If no fusion, insert the original (address, size) back
    IF entry_address == addr_fwd && entry_size == size_fwd
        SIZE_DICT.insert (entry_size, entry_address)
    ENDIF
    // Reset bits in Fusing Bit-String
    reset_bits (entry_address, entry_size)
ENDIF
```

```
ALGORITHM 3: Fusing (Input parameters: address, size)

fuse_bwd (address, size)
    previous_address = scan_bwd (address)
    IF previous_address != address
        // There's an adjacent free block before the current freed block
        previous_size = address – previous_address
        // Update size map with the fused block
        SIZE_DICT.insert (size + previous_size, previous_address)
    ENDIF
RETURN
fuse_fwd (address, size)
    next_address = address + size
    next_next_address = scan_fwd (next_address)
    IF next_next_address != next_address
        // There's an adjacent free block after the current freed block
```

-continued

```
ALGORITHM 3: Fusing (Input parameters: address, size)

next_size = next_next_address – next_address
        // Update size map with the fused block
        SIZE_DICT.insert (size + next_size, address)
    ENDIF
RETURN
```

Allocations are O(log n) if the size-indexed dictionary is implemented using a Balanced Binary Tree. For e.g., C++ provides std::multimap. Performance can be improved to O(1) if the size-indexed dictionary is implemented using a hash-table. For example, C++ provides std::unordered_multimap. Free operations trigger forward and backward scans to adjacent allocations. Scans become linear during sparse allocations. However, as the system scales up with more and more allocations, neighboring adjacent allocations have a shorter reach. Indeed, the scheme presented in this section is targeted for dense allocation profiles where allocations are close to each other in terms of the memory location addresses. On scaled systems, scans are short on average. Free operations also tend to be O(log n) on scaled systems, using a Balanced Binary Tree or O(1) using a hash-table.

Figure 36:
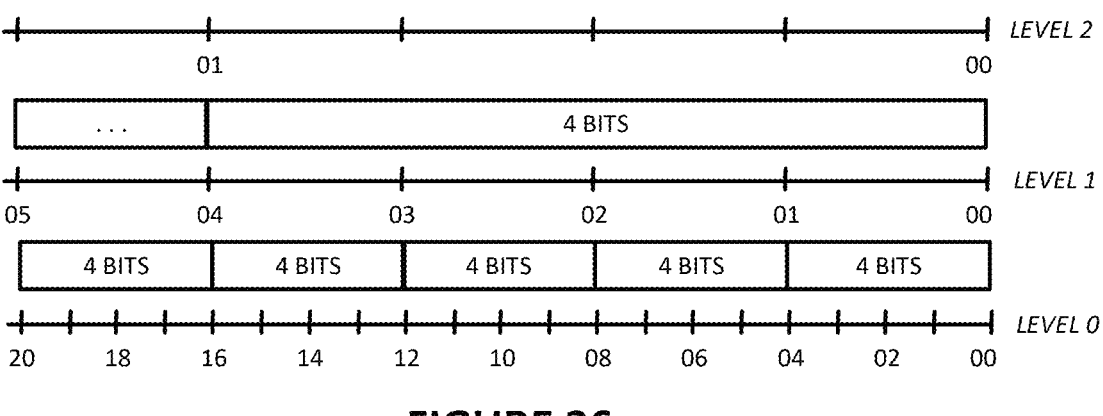
FIG. 36 illustrates an example multi-level fusing bit-string.
Figure 37:
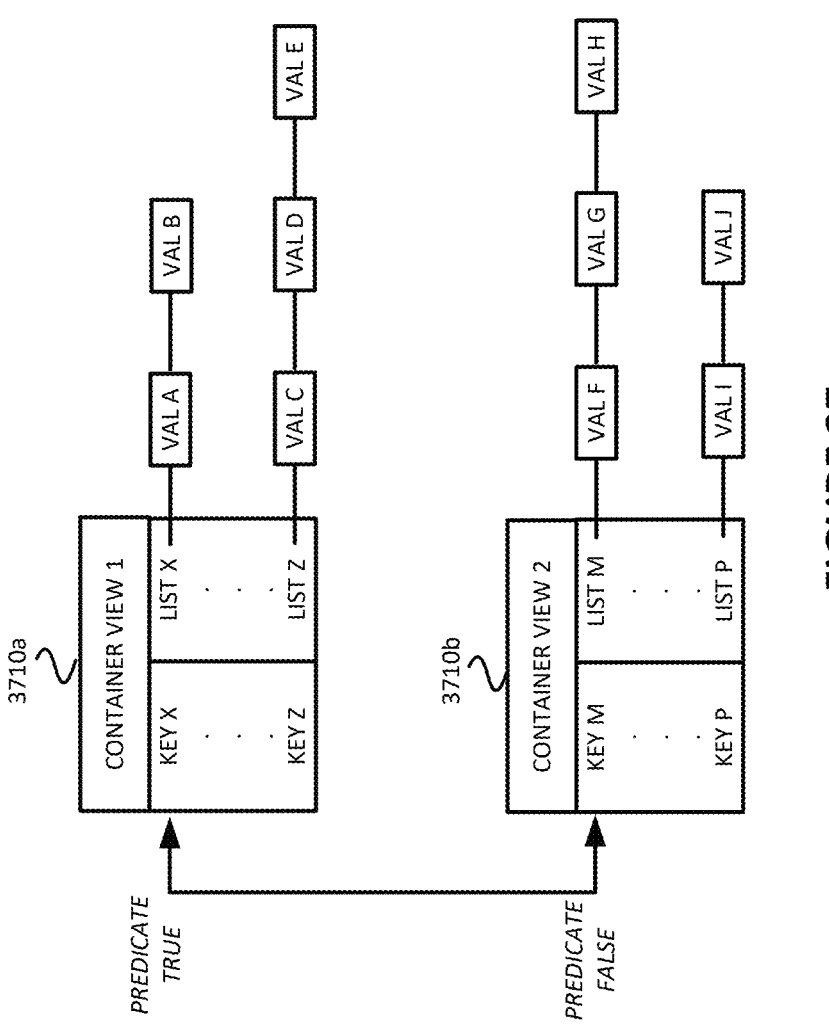
FIG. 37 illustrates using a user-specified predicate to allow split views into a container.

As noted above, a fusing bit string may be used to scan for adjacent free blocks during the fusing operation. Since the scans are linear, dense allocations with high scale produce relatively short scans as most allocations are within a few words from each other. However, as also noted above, with sparse allocations and a large memory address space, linear scans become bottlenecks as they are slow. Example embodiments solve this problem with a "Multi-level Bit-string," described below. FIGS. 36 and 37 illustrate the improved scanning procedure.

More specifically, instead of a single bit-string for the entire address space, multiple bit-strings are created, at various levels. A level-0 bit-string has a size equal to the entire address space. A level-1 bit-string has a size equal to $\frac{1}{32}$ of the level-0 size, assuming 32-bit words. A level-2 bit-string has a size equal to $\frac{1}{32}$ of the level-1 size, and so on, until a level (level-N) having a size of just one or two words is reached.

In the simplified example of FIG. 36, assume a hypothetical 4-bit word. An address space of 20 words at level-0 gives us an address space of five (5) words at level-1 and just two words at level-2.

Large scans are considered now. Imagine scanning across two address separated by one million empty words. Since a single bit-string, the scan would traverse one million bits, checking the status of each bit. With the multilevel bit-string, the scan would jump to a higher level as soon as a word boundary is hit. The scan at the higher level speeds up the search process 32 times (assuming a 32-bit word). If a word boundary is hit at the current level, the scan jumps to the next level, speeding up the process another 32 times.

Further, rather than using a single balanced-binary tree for the size-indexed dictionary, the improved embodiment uses a front-facing balanced-binary tree, which uses available "size" as the key. The value obtained from the "size" lookup is a list of addresses, stored in a hash-table. The improved embodiment exploits the fact that the total occurrences of sizes in a large memory space (with millions of addresses) is far lower than the addresses at which these sizes can occur in the memory space. Since the total sizes are relatively fewer compared to the addresses, the slower balanced-binary tree is used to index the sizes, while the faster hash-tables are used to index the list of addresses for each corresponding size. Although hash-tables are faster than balanced-binary trees, balanced-binary trees still are useful because they provide ordering of keys, which allows for more flexible queries. Internal experiments have demonstrated significant performance gains with the improved fuse allocator.

Example implementations of the improved embodiment allows the user to specify a predicate condition at the time of instantiation. Referring to FIG. 37, memory allocations are split into two separate views 3710a and 3710b based on whether the allocated size satisfies the given predicate condition (Predicate True or Predicate False). The split-views are used to meet certain ASIC requirements. For example, assume that the route lookup block in the ASIC fixed pipeline can only access nexthop memory addresses from 0 through 1 million. Assume also that all such route accessible nexthops are less than eight (8) words in size. A predicate is set to produce two views in which one view (Recall, e.g., 3710a) contains all allocations less than (8) words, and the other view (Recall, e.g., 3710b) contains all allocations larger than eight (8) words. Allocations satisfying the predicate (small allocations) are allocated from the lower order address space (e.g., from address 0 and work towards higher addresses). Allocations that do not satisfy the predicate (large allocations) are allocated from the higher order address space (e.g., start from largest address and work towards lower addresses).

FIG. 37 illustrates using a user-specified predicate to allow split views into a container. More specifically, in the example of FIG. 37, container contents are separated into two (2) views 3710a and 3710b. View 1 3710a indexes contents satisfying the user-specified predicate, while View 2 3710b indexes contents that do not satisfy the user-specified predicate. Note that repeating keys are handled by inserting a single key into a std::map, with a value as a list of unique values.

Performance is improved over an implementation using std::multimap if the total number of unique keys is relatively small. For example, size-indexed entries can exploit the fact that the number of unique sizes occurring in a system is usually less than the number of unique addresses in a memory space.

Network elements usually perform a "Delayed Free" of the forwarding-instructions from the memory locations. A delay of the order of a few tens of milliseconds is added to allow the packets in flight to complete their forwarding path. Instantaneously freeing up forwarding-instructions could result in unpredictable ASIC behavior if the freed memory locations are immediately reused for newer instructions. In-flight packets could misinterpret the newer instructions leading to undesirable states such as wedges. "Delayed Free" could be implemented by a separate dedicated "Slow-Free" thread. The main thread queues up the memory addresses to be freed to the "Slow-Free" thread. The "Slow-Free" thread performs the actual freeing of memory locations after a delay of a few tens of milliseconds.

§ 5.8 Conclusions

Example embodiments consistent with the present description allows dense packing of ingress and egress memory instructions in the fungible memory. This, in turn, allows increased scale of deployed services in the customer network.

Example implementations provide a dynamic, adaptive, solution in which memory dynamically adapts to the configuration, regardless of whether it is ingress heavy, egress heavy, or something in between. Static (permanent) partitions of memory are not needed, and preferably, there are no static partitions.

Further, example implementations are uniquely tailored for fungible memory in a fixed pipeline architecture.

Furthermore, example implementations provide abstractions for hardware constraints. The example solution implements multiple abstractions to overcome hardware constraints. For example, aligned allocations for certain instruction types skew smaller allocations towards the lower address range, overflowing some fixed memories to the fungible memory, etc.

In some example implementations, master and per-PFE allocators use the a fuse (coalesce) allocator in which smaller adjacent free blocks can be actively fused/combined into larger available blocks. These implementations decrease the chances for fragmentation.

What is claimed is:

1. A memory management system for use in a system having a plurality of packet forwarding engines (PFEs), each having a memory, each of the memories having a plurality of blocks, and each of the blocks having a plurality of words, the memory management system comprising:

a) a master allocator configured to
    1) receive a request for a memory block or word allocation from an application, and
    2) responsive to receiving the request, return an allocation of memory block or word to the application;

b) a per-PFE allocator associated with each of the PFEs, each configured to
    1) receive a request for a memory block or word allocation from an application,
    2) responsive to receiving the request, request a memory block allocation from an arbiter,
    3) receive a memory block allocation from the arbiter,
    4) allocate a word from the memory block allocation, and
    5) return the block and word allocation to the application;

c) the arbiter configured to
    1) maintain, for each of the PFEs, a list of In-Use memory blocks and a list of Available memory blocks, and
    2) act as an intermediary between each of the per-PFE allocators and the master allocator; and d) the application configured to
    1) generate ingress instructions and egress instructions,
    2) write ingress instructions to one or more allocated words common in the memory of all of the PFEs, and
    3) write egress instructions to an allocated block in the memory of a specific one of the PFEs.

2. The memory management system of claim 1 wherein the master allocator and arbiter can allocate words of any free block to an ingress instruction and any free block to an egress instruction.

3. The system of claim 1, wherein the ingress instruction is selected from a group of instructions including (A) identifying an outgoing interface for a packet, (B) identifying an outgoing port for a packet, (C) popping a label from a packet, (D) swapping a label of a packet, (E) adding a label to a packet, (F) packet classification, (G) packed scheduling, (H) packet policing, (I) packet filtering, (J) packet accounting, (K) packet sampling, (L) packet mirroring, (M) unicast reverse path checking, (N) multicast reverse path checking, (O) class-based routing, (P) packet header re-writes, and (Q) packet marking.

4. The system of claim 1, wherein the egress instruction is selected from a group of instructions consisting of (A) next hop determination, (B) Ethernet header addition, (C) label addition, (D) tunnel header addition, (E) encapsulation, and (F) maximum transmission unit (MTU) check.

5. The system of claim 1, wherein the master allocator, each of the per-PFE allocators, the arbiter and the application are software modules executed by a common controller unit.

6. The system of claim 5, wherein the common controller unit is a single, multicore, central processing unit (CPU).

7. The system of claim 1, wherein the master allocator, each of the per-PFE allocators, the arbiter and the application, and each of the plurality of PFEs are provided on a line card on a chassis-based switch or chassis-based router.

8. The system of claim 1, wherein each of the plurality of PFEs is provided in one or more PFE groups on one or more PFE planes.

9. A memory management method for use in a system having a plurality of packet forwarding engines (PFEs), each having a memory, each of the memories having a plurality of blocks, and each of the blocks having a plurality of words, the memory management method comprising:

a) receiving, by a master allocator, a request for a memory block or word allocation from an application;

b) responsive to receiving the request for a memory block or word allocation from the application, returning, by the master allocator, an allocation of memory block or word to the application;

c) receiving, by a per PFE allocator, a request for a memory block or word allocation from the application;

d) responsive to receiving the request for a memory block or word allocation from the application, requesting, by the per-PFE allocator, a memory block allocation from an arbiter;

e) receiving, by the per-PFE allocator, a memory block allocation from the arbiter;

f) allocating, by the per-PFE allocator, a word from the memory block allocation;

g) returning, by the per-PFE allocator, the block and word allocation to the application;

h) maintaining, by the arbiter and for each of the PFEs, a list of In-Use memory blocks and a list of Available memory blocks;

i) acting, by the arbiter, as an intermediary between each of the per-PFE allocators and the master allocator;

j) generating, by the application, ingress instructions and egress instructions;

k) writing, by the application, ingress instructions to one or more allocated words common in the memory of all of the PFEs; and l) writing, by the application, egress instructions to an allocated block in the memory of a specific one of the PFEs.

* * * * *